United States Patent [19]

Weaver et al.

[11] Patent Number: 4,532,052
[45] Date of Patent: Jul. 30, 1985

[54] POLYMERIC WELL TREATING METHOD

[75] Inventors: Jimmie D. Weaver; Lawrence E. Harris; Weldon M. Harms, all of Duncan, Okla.

[73] Assignee: Halliburton Company, Duncan, Okla.

[21] Appl. No.: 411,209

[22] Filed: Aug. 25, 1982

Related U.S. Application Data

[62] Division of Ser. No. 946,700, Sep. 28, 1978, abandoned.

[51] Int. Cl.³ .................... E21B 43/22; E21B 33/138
[52] U.S. Cl. ................... 252/8.55 R; 166/275; 166/294; 166/307; 252/8.55 C; 252/8.55 D; 525/385
[58] Field of Search ......... 252/8.55 R, 8.55 D, 252/8.55 C; 525/385; 166/294

[56] References Cited

U.S. PATENT DOCUMENTS

| | | | |
|---|---|---|---|
| 2,607,761 | 8/1952 | Seymour | 525/385 |
| 2,761,843 | 9/1956 | Brown et al. | 252/8.55 |
| 2,806,842 | 9/1957 | Gerecht et al. | 525/385 |
| 2,808,397 | 10/1957 | Stroh et al. | 525/385 X |
| 2,938,887 | 5/1960 | Weiss | 525/385 X |
| 3,336,977 | 8/1967 | Amott | 166/274 |
| 3,543,855 | 12/1970 | Blatz et al. | 166/274 |
| 3,687,199 | 8/1972 | Jennings | 166/274 |
| 3,826,311 | 7/1974 | Szabo et al. | 166/294 X |
| 3,844,348 | 10/1974 | Stratton | 166/274 X |
| 4,002,589 | 1/1977 | Farley et al. | |
| 4,011,910 | 3/1977 | Rhudy et al. | 166/294 X |
| 4,085,168 | 4/1978 | Milkovich et al. | 260/886 |
| 4,100,079 | 7/1978 | Sinkovitz et al. | 252/8.55 |
| 4,115,339 | 9/1978 | Restaino | 526/240 X |
| 4,138,446 | 2/1979 | Kawakami et al. | |
| 4,366,074 | 12/1982 | McLaughlin et al. | 252/8.55 |

*Primary Examiner*—Herbert B. Guynn
*Attorney, Agent, or Firm*—Thomas R. Weaver; Robert A. Kent

[57] ABSTRACT

Several new treatment processes and compositions for practicing these processes are provided which substantially alter the fluid flow and surface characteristics of porous permeable particulate formations, especially subterranean formations intersected by an oil well. The compositions of this invention also provide methods of increasing viscosity or gelling aqueous fluids, especially acids, which can be used to treat such earthen formations. Treatment of the earthen formations with the compositions of this invention can substantially modify the permeability and surface characteristics of the formation to prevent or reduce the flow of aqueous fluids, especially water and formation brines through that portion of the formation, thereby reducing the water-oil ratio of fluid flowing through or produced from that formation and in some cases enhancing the hydrocarbon production. The treatment of this invention uses branched organic polymers of a wide molecular weight range. The branches are preferably hydrophilic and the polymer contains bonding groups (e.g. ionic bonding groups) which serve to attract or repel a substrate, a particular formation, suspended solids, other polymers or segments, carrier fluid or a fluid to be treated.

4 Claims, No Drawings

POLYMERIC WELL TREATING METHOD

This is a division of application Ser. No. 946,700, filed Sept. 28, 1978, now abandoned.

Numerous methods have been used to treat earthen formations and especially subterranean formations intersected by an oil well which produce water as well as oil or hydrocarbon. Production of the water or brine reduces the value of the well since the water is normally unwanted and requires expensive methods for disposal. Likewise the penetration of aqueous fluids into earthen formations is frequently undesired, especially in the drilling, completion or workover phases of an oil well in which the filtrate entering certain formations from fluids used in the well can damage the formation. In treating subterranean formations for these and other purposes, aqueous gels are frequently used for stimulation (e.g. acidizing and fracturing), completion (e.g. cementing, gravel packing and perforating), drilling, workover, grouting, mobility control, and water control. Several systems are also available to increase the viscosity of aqueous fluids, such as acidic fluids. However, the previous methods and compositions present problems such as being temporary, unstable or possessing other problems.

Several of the numerous methods previously used to reduce the flow of aqueous fluids into or out of such formations are described in the following U.S. Pat. No. 3,393,912 to Sparlin et al; U.S. Pat. No. 3,868,999 to Christopher et al; U.S. Pat. No. 3,830,302 to Dreher et al; U.S. Pat. No. 3,826,311 to Szabo et al; U.S. Pat. No. 3,820,603 to Knight et al; and U.S. Pat. No. 3,779,316 to Bott. Sparlin describes a method for reducing the production water from oil wells by injecting into the well a viscous oil containing a coupling agent selected from phenolic and furan resins. Christopher describes a method for reducing the water permeability of a formation as compared to the oil permeability by injecting into a formation a slug of fluid comprising a hydrocarbon solvent, colloidal silica, water and a polymeric material. Dreher describes a method for reducing the water oil ratio of a producing well by treating a formation with a combination of an aqueous organic polyelectrolyte such as polyacrylamide and a cationic surfactant. Szabo describes the use of a certain copolymer of (3-acrylamido-3-methyl)butyl trimethyl ammonium chloride and acrylamide having a molecular weight of at least 100,000 to reduce the water production of fingering in a waterflooding process using emulsions of a water soluble anionic vinyl addition polymer and a water soluble cationic polymer.

In addition to the above described prior art references numerous references describe methods of using, preparing and using polymers for treating earthen formations. Selected patents and articles are listed as follows:

1. Canadian Pat. No. 731,212
2. Canadian Pat. No. 864,433 to Kaufman
3. U.S. Pat. No. RE 29,595 to Adams et al
4. U.S. Pat. No. 1,877,504 to Grebe et al
5. U.S. Pat. No. 2,138,763 to Graves
6. U.S. Pat. No. 2,222,208 to Ulrich
7. U.S. Pat. No. 2,223,930 to Griessbach et al
8. U.S. Pat. No. 2,223,933 to Garrison
9. U.S. Pat. No. 2,265,759 to Lawton et al
10. U.S. Pat. No. 2,272,489 to Ulrich
11. U.S. Pat. No. 2,296,225 to Ulrich
12. U.S. Pat. No. 2,296,226 to Ulrich
13. U.S. Pat. No. 2,331,594 to Blair
14. U.S. Pat. No. 2,345,713 to Moore et al
15. U.S. Pat. No. 2,382,185 to Ulrich
16. U.S. Pat. No. 2,570,895 to Wilson
17. U.S. Pat. No. 2,663,689 to Kingston et al
18. U.S. Pat. No. 2,677,679 to Barney
19. U.S. Pat. No. 2,731,414 to Binder et al
20. U.S. Pat. No. 2,745,815 to Mussell
21. U.S. Pat. No. 2,758,970
22. U.S. Pat. No. 2,761,843 to Brown
23. U.S. Pat. No. 2,771,138 to Beeson
24. U.S. Pat. No. 2,772,179 to Kalinowski et al
25. U.S. Pat. No. 2,801,984 to Morgan et al
26. U.S. Pat. No. 2,801,985 to Roth
27. U.S. Pat. No. 2,823,191
28. U.S. Pat. No. 2,924,861
29. U.S. Pat. No. 2,827,964 to Sandiford et al
30. U.S. Pat. No. 2,842,338 to Davis et al
31. U.S. Pat. No. 2,842,492 to von Engelhardt et al
32. U.S. Pat. No. 2,852,467 to Hollyday
33. U.S. Pat. No. 2,864,448 to Bond et al
34. U.S. Pat. No. 2,908,641 to Boyle
35. U.S. Pat. No. 2,940,729 to Rakowitz
36. U.S. Pat. No. 2,940,889 to Justice
37. U.S. Pat. No. 2,985,609 to Plitt
38. U.S. Pat. No. 3,002,960 to Kolodny
39. U.S. Pat. No. 3,020,953 to Zerweck et al
40. U.S. Pat. No. 3,023,760 to Dever et al
41. U.S. Pat. No. 3,025,237 to Roper
42. U.S. Pat. No. 3,028,351 to Plitt
43. U.S. Pat. No. 3,039,529 to McKennon
44. U.S. Pat. No. 3,042,641 to West et al
45. U.S. Pat. No. 3,050,493 to Wagner et al
46. U.S. Pat. No. 3,051,751 to Levis et al
47. U.S. Pat. No. 3,053,765 to Sparks
48. U.S. Pat. No. 3,057,798 to Knox
49. U.S. Pat. No. 3,070,158 to Roper et al
50. U.S. Pat. No. 3,087,543 to Arendt
51. U.S. Pat. No. 3,102,548 to Smith et al
52. U.S. Pat. No. 3,108,069 to Monroe et al
53. U.S. Pat. No. 3,116,791 to Sandiford et al
54. U.S. Pat. No. 3,179,171 to Beale
55. U.S. Pat. No. 3,210,310 to Holbert et al
56. U.S. Pat. No. 3,254,719 to Root
57. U.S. Pat. No. 3,283,812 to Ahearn et al
58. U.S. Pat. No. 3,284,393 to Vanderhoff et al
59. U.S. Pat. No. 3,305,016 to Lindblom et al
60. U.S. Pat. No. 3,308,885 to Sandiford
61. U.S. Pat. No. 3,317,442 to Clarke
62. U.S. Pat. No. 3,334,689 to McLaughlin
63. U.S. Pat. No. 3,349,032 to Krieg
64. U.S. Pat. No. 3,367,418 to Routson
65. U.S. Pat. No. 3,370,647 to Wolgemuth
66. U.S. Pat. No. 3,370,650 to Watanabe
67. U.S. Pat. No. 3,376,924 to Felsenthal et al
68. U.S. Pat. No. 3,380,529 to Hendrickson
69. U.S. Pat. No. 3,382,924 to Veley et al
70. U.S. Pat. No. 3,399,725 to Pye
71. U.S. Pat. No. 3,415,673 to Clock
72. U.S. Pat. No. 3,418,239 to Copper
73. U.S. Pat. No. 3,419,072 to Maley et al
74. U.S. Pat. No. 3,422,890 to Darley
75. U.S. Pat. No. 3,434,971 to Atkins
76. U.S. Pat. No. 3,451,480 to Zeh et al
77. U.S. Pat. No. 3,483,121 to Jordan
78. U.S. Pat. No. 3,483,923 to Darley
79. U.S. Pat. No. 3,491,049 to Gibson et al 80. U.S. Pat. No. 3,494,965 to Jones et al
81. U.S. Pat. No. 3,500,929 to Eilers et al
82. U.S. Pat. No. 3,510,342 to Demmig et al
83. U.S. Pat. No. 3,516,944 to Litt et al
84. U.S. Pat. No. 3,537,525
85. U.S. Pat. No. 3,545,130 to Strother et al
86. U.S. Pat. No. 3,562,226 to Gayley et al
87. U.S. Pat. No. 3,565,941 to Dick et al
88. U.S. Pat. No. 3,567,659 to Nagy
89. U.S. Pat. No. 3,572,416 to Kinney et al
90. U.S. Pat. No. 3,578,781 to Abrams et al
91. U.S. Pat. No. 3,603,399 to Reed
92. U.S. Pat. No. 3,609,191 to Wade
93. U.S. Pat. No. 3,624,019 to Anderson et al
94. U.S. Pat. No. 3,625,684 to Poot et al
95. U.S. Pat. No. 3,635,835 to Perterson
96. U.S. Pat. No. 3,640,741 to Estes
97. U.S. Pat. No. 3,660,431 to Hatch et al
98. U.S. Pat. No. 3,666,810 to Hoke
99. U.S. Pat. No. 3,734,873 to Anderson et al
100. U.S. Pat. No. 3,738,437 to Scheuerman
101. U.S. Pat. No. 3,741,307 to Sandiford et al
102. U.S. Pat. No. 3,744,566 to Tamas et al
103. U.S. Pat. No. 3,779,316 to Bott
104. U.S. Pat. No. 3,729,914 to Nimerick
105. U.S. Pat. No. 3,781,203 to Clark et al
106. U.S. Pat. No. 3,791,446 to Tate
107. U.S. Pat. No. 3,820,603 to Knight et al
108. U.S. Pat. No. 3,822,749 to Thigpen
109. U.S. Pat. No. 3,826,311 to Szabo et al
110. U.S. Pat. No. 3,827,495 to Reed
111. U.S. Pat. No. 3,827,500 to Reed
112. U.S. Pat. No. 3,830,302 to Dreher et al
113. U.S. Pat. No. 3,833,718 to Reed et al
114. U.S. Pat. No. 3,842,911 to Knox et al
115. U.S. Pat. No. 3,845,824 to Tinsley
116. U.S. Pat. No. 3,868,328 to Boothe et al
117. U.S. Pat. No. 3,868,999 to Christopher et al
118. U.S. Pat. No. 3,888,312 to Tiner et al
119. U.S. Pat. No. 3,893,510 to Elphingstone
120. U.S. Pat. No. 3,768,566 to Ely et al
121. U.S. Pat. No. 3,898,165 to Ely et al
122. U.S. Pat. No. 3,909,423 to Hessert et al
123. U.S. Pat. No. 3,922,173 to Misak
124. U.S. Pat. No. 3,939,912 to Sparlin et al
125. U.S. Pat. No. 3,974,220 to Heib et al
126. U.S. Pat. No. 3,994,344 to Friedman
127. U.S. Pat. No. 4,021,355 to Holtmyer et al
128. U.S. Pat. No. 4,033,415 to Holtmyer et al
129. U.S. Pat. No. 4,029,747 to Merkl
130. U.S. Pat. No. 4,058,491 to Steckler
131. U.S. Pat. No. 4,069,365 to Rembaum
132. U.S. Pat. No. 4,073,763 to Tai
133. U.S. Pat. No. 4,079,027 to Phillips et al
134. U.S. Pat. No. 4,079,059 to Dybas et al
135. U.S. Pat. No. 3,878,895 to Wieland
136. U.S. Pat. No. 4,094,795 to DeMartino et al
137. U.S. Pat. No. 4,094,831 to Sandstrom.

ARTICLES AND BOOKS

1. Barkman, J. H.; Abrams, A.; Darley, H. C. H.; and Hill, H. J.; "An Oil Coating Process to Stabilize Clays in Fresh Water Flooding Operation," SPE-4786, SPE of AIME Symposium on Formation Damage Control, New Orleans, La., Feb. 7-8, 1974.
2. Coppel, Claude F.; Jennings, Harley X.; and Reed, M. G.; "Field Results From Wells Treated With Hydroxy-Aluminum," JOURNAL OF PETROLEUM TECHNOLOGY (September 1973) pp. 1108-1112.
3. Dow Chemical Company, "PEI Polymers ... Infinite Modifications, Practical Versatility," Copyrighted 1974.
4. Graham, John W.; Monoghan, P. H.; & Osoba, J. S.; "Influence of Propping Sand Wettability of Productivity of Hydraulically Fractured Oil Wells," PETROLEUM TRANSACTIONS, AIME, Vol. 216 (1959).
5. Hower, Wayne F.; "Influence of Clays on the Production of Hydrocarbons," SPE-4785, SPE of AIME Symposium on Formation Damage Control, New Orleans, La., Feb. 7-8, 1974.
6. Hower, Wayne F.; "Adsorption of Surfactants on Montmorillonite," CLAYS AND CLAY MINERALS, Pergamon Press (1970) Vol. 18, pp. 97-105.
7. Hoover, M. F., & Butler, G. B.; "Recent Advances in Ion-Containing Polymers," J. POLYMER SCI, Symposium No. 45, 1-37 (1974).
8. Jackson, Kern C.; TEXTBOOK OF LITHOLOGY, McGraw-Hill Book Company (1970) (Library of Congress Catalogue Card No. 72-958LO) pp. 95-103.
9. Theng, B. K. G.; THE CHEMISTRY OF CLAY-ORGANIC REACTIONS, John Wiley & Son (1974) (Library of Congress Catalog Card No. 74-12524) pp. 1-16.
10. Veley, C. D.; "How Hydrolyzable Metal Ions Stabilize Clays To Prevent Permeability Reduction," SPE-2188, 43rd Annual Fall Meeting of SPE of AIME, Houston, Tex. (Sept. 29-Oct. 2, 1968).
11. Milchem Incorporated, "Milchem's SHALE-TROL Sticky Shale Can't Stop You Anymore," DF-5-75-1M.
12. Chemergy Corporation, "Maintain Maximum Production With PermaFIX and PermaFLO Treatments for CLAY/FINE and SAND CONTROL."
13. ENCYCLOPEDIA POLYMER SCIENCE AND TECHNOLOGY, Suppl. No. 1, "Alkylenimine Polymers," Interscience Publ., N.Y. Copyrighted 1976, pp25-52.
14. Roberts, John D. & Caserio, Marjorie, C., BASIC PRINCIPLES OF ORGANIC CHEMISTRY, Pub. W. A. Benjamin Inc., New York, 1965.
15. Mettzer, Yale L.; WATER SOLUBLE RESINS AND POLYMERS, Noyes Data Corp., Park Ridge, N.J., 1976
16. Whistler Roy L.; INDUSTRIAL GUMS, Academic Press, N.Y., 1973.
17. Hoover, Fred M.; "Cationic Quaternary Polyelectrolytes—A Literature Review," J. MACROMOL. SCI-CHEM., A4(6), October, 1970, pp 1327-1418.
18. Robinson and Stokes, "Electrolyte Solutions," Butterworth Scientific Publications, 1959.
19. "Enhanced Oil and Gas Recovery & Improved Drilling Methods," 4th Annual DOE Sumposium Vol. 1A (Oil) of Proceedings, Aug. 29-31, 1978; pp B-1/1-B-1/25; Tulsa, Okla.; Published by The Petroleum Publishing Co., Box 1260, Tulsa, OK 74104.

In addition to the above references, a presently copending patent application in the name of Homer C. McLaughlin and Jimmie D. Weaver, Ser. No. 901,664 filed May 4, 1978, now U.S. Pat. No. 4,462,718, describes the use of various polymers for stabilizing clays in earthen formations, especially a subterranean formation. The above references and each reference cited herein are incorporated herein by reference to any extent necessary.

By this invention there is provided a method for altering the properties of aqueous or organic fluids or combinations thereof. "Aqueous fluids" as used herein means any fluid containing some water. It can also contain other components such as hydrocarbons (such as alcohols, ethers and other miscible or partially miscible solvents), acids, water soluble or water dispersible salts, easily gasifiable components (such as $CO_2$ and $N_2$) or solids (such as sand, Portland cement and proppants), or other plastics or polymers such as resins. These materials can include those which are settable to a rigid or semirigid solid as well as those which are not settable. The fluid can also contain particulate material such as sand, clay or acid soluble particles (e.g. carbonate). These fluid properties are primarily viscosity and the resulting apparent viscosity of the fluid in various media. This alteration of fluid properties is useful for producing viscosified and gelled fluids and for treating various substrates to alter the characteristics of the substrate such as its surface active nature or the interaction between a treated substrate and various fluids. The compositions provided by this invention for altering fluid properties or treating various substrates can be formulated to produce the combination of composition properties desired, e.g., solubility, affinity or repulsion for various fluids and/or solids; stability to or degradation by components such as oxygen, acids and water at various temperatures; or viscosity characteristics which vary with time, temperature, concentration, etc. These compositions and processes have particular applications in thickening various fluids such as aqueous fluids and acids for treating earthen formations especially those intersected by a well such as those used to produce water, oil, gas, steam and other resources. The compositions use as an essential component one certain type of polymer. This type of polymer is a branched organic polymer having a backbone chain with an average of at least one branch chain per backbone chain and with said branch chain being an average of at least two polymeric units in length. In the branched polymer up to about 98 per 100 backbone polymer units can have one or more branches. The branched polymer can have one or more branch chains on each polymer unit in the backbone chain if the polymerization or grafting conditions, polymer units, economics and the like permit. A polymer unit as used herein refers to the part of a polymer chain derived from a monomer whether in the backbone chain, branch chain or both and whether derived directly from a monomer or whether partially polymerized or reacted to form a polymer precursor, oligomer or polymer chain.

A preferred class of polymers within the broad class of branched polymers of this invention is branched water soluble polymers. The branched polymers can contain polymer units, segments or portions in various arrangements which are oleophilic, oleophobic, hydrophilic, hydrophobic or combinations thereof. One preferred class of branched polymers contains large portions, concentrations or proportions of hydrophilic units or segments. The branched polymers of this invention generally comprise combinations of hydrocarbon radicals and hetero groups. Hydrocarbon radicals as used herein, generally represented by R, contain hydrogen and carbon and can also contain hetero atoms or groups but generally hydrogen and carbon are the predominate number of atoms. For example, the hydrocarbon radical can include but is not limited to

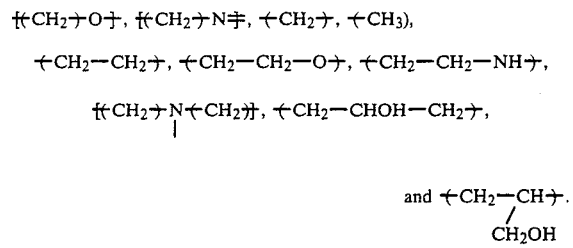

Another preferred class of branched polymers of this invention are those containing ionic groups. These ionic groups can be cationic, anionic, amphoteric, neutral or ionically balanced or combinations thereof. The ionic groups usually are or contain hetero atoms or groups which as used herein are oxygen, nitrogen, sulfur, phosphorous, metals such as the alkali metals, alkaline earth metals, Groups IV, V and VII metals of the Periodic Table, combinations thereof and combinations thereof with carbon and/or hydrogen. Ionic groups can be included in or with aromatic groups, heterocyclic groups, unsaturated linkage, carboxyl, carbonyl, keto, amide, imide, sulfo, hydroxyl and such like.

Thus, the invention can be broadly considered as the use of certain types of branched polymers and the discovery of certain branched polymers which have unexpected stability and effectiveness. For example, in treating an earthen formation or altering properties of an aqueous fluid using a water dispersible polymer, the treatment or alteration can be improved by using one of these certain branched polymers having a molecular weight of about 900–50,000,000 with an average of at least one branch chain per backbone chain and with the branch chain being an average of at least two polymeric units in length. The branched polymer can optionally be ionic or contain ionic and/or nonionic segments depending on the particular effect and application desired. The branched polymer can be made by any one of several methods or variations and can be made to contain the particular combination of segments and properties desired in view of the teachings herein. Likewise, the branched polymer can be applied or used using any one of numerous methods or variations thereof.

In one aspect of the invention, branched ionic polymers are used to treat particulate or fibrous formations, especially earthen particles, to alter the fluid flow characteristics and/or surface characteristics of the particles or earthen formation. The branched polymers of this invention can be used to alter the viscosity or gel structure of many aqueous fluids and to alter the surface properties, fluid flow, and attraction/repulsion characteristics of many formations. The same or different mechanisms may bring about the alterations in the different applications. The formations can be composed of loose or consolidated particles or fibers. The formation can also be suspended particles, fibers or masses. A formation can be a solid impermeable mass which has been etched or leached to form a porous, permeable formation which is equivalent to a porous permeable formation made by compacting particles or fibers. Compacted formations can be loose or consolidated by natural or artificial binders such as resins, inorganic cements, including silicate and Portland types. As used herein, particulate and particulate formation shall include each of the above types of particles, formations or structures. The fluid flow or surface characteristics mean the net response of the particles or formation to flow or resistance to flow relative to a particular fluid and to the attraction, repulsion or relatively inert nature of the particles or formation to one or more fluids or materials suspended in the fluids. The particles can be suspended in a fluid or packed either loosely or tightly into a mass. Within this aspect of the invention, one particular process involves the treatment of particles packed into a formation to decrease the permeability of the formation to the flow of water or an aqueous fluid. The process comprises merely placing or contacting a liquid phase adjacent to the formation containing an effective amount of a polymer to treat at least a portion of the adjacent formation. The treated zone should preferably have a minimum thickness of about one inch. Of course, for applications altering aqueous fluid properties, such as altering fluid loss of a treatment or drilling fluids, the penetration of aqueous fluid and branched polymer should be a minimum or only a fraction of an inch. The polymer is preferably a branched organic polymer having a molecular weight of about 900–50,000,000 with a backbone chain having reactive sites on which a branch chain can be or has been attached with branched chains being attached to the backbone chain in a concentration of about 0.1–99% of said reactive sites. The branched organic polymer also contains a hydrophilic portion in a concentration sufficient to produce the desired hydrophilic-hydrophobic balance within the formation and to alter the hydrophilic characteristics in the formation. This liquid phase flows or is pumped or injected into the formation and the polymer is allowed to contact the formation. For this use, the preferred classes of polymers have bonding groups, e.g., ionic groups for bonding or attaching to the formation. For example, where the formation possesses a generally anionic nature, a preferred polymer would be a cationic polymer so that the cationic groups can attach or associate with the anionic sites of the formation. The higher molecular weight polymers and polymers with high concentrations of ionic groups also tend to make the treatment more permanent and to have improved efficiency or effectiveness.

In yet another aspect of the invention, another class of polymers can be prepared which have some hydrophobic and/or oleophilic portions, branches or overall nature so that these polymers can be attached to formations or suspended within fluids in the formation to produce a surface effect on the particles or formation which retards the flow of organic fluids or hydrocarbon fluids and increases the permeability of the formation to aqueous fluids or would tend to gel hydrocarbon or organic based fluids. As used herein, hydrocarbon fluids include both oil, gas and mixtures thereof. One aspect of altering the permeability of the formation is the change of water-oil ratio (WOR). As used herein WOR shall include the ratio of aqueous fluid to hydrocarbons including oil, gas or mixtures thereof. The production of various polymer classes to accomplish the desired modification; produce the desired attracting, repelling or suspending properties; and produce the desired viscosifying, gelling or preference for organic or aqueous liquids can be prepared in view of the disclosure herein.

For example, a preferred class of cationic polymers which are hydrophilic and have highly hydrophilic branch chains can be used to treat or attach to a formation having anionic sites. This attachment is long lasting or essentially permanent in that the effect is not readily removed by washing or flowing through the formation with acids, bases, organic or aqueous fluids. These polymers are also useful for clay stabilization. The hydrophilic portion of the polymer hydrates in the presence of water, brine or most aqueous fluids which is thought to induce pseudostructure in the aqueous fluid resulting in an apparent increase in viscosity. Or in other words, the net effect is to increase the resistance to flow or pressure required to produce a given flow of aqueous fluid. The hydrophilic portion is thought to partially dehydrate, shrink or form a smoother flow channel in the presence of hydrocarbons or other organic fluids, thereby increasing permeability to organic fluids or not substantially changing the permeability to hydrocarbons. Certain preferred polymers of this invention have an effectiveness such that they produce at least a 10% change in the relative permeability to an aqueous fluid in most loose or consolidated particulate formations, either packs or cores. This hydrophilic nature of the branched polymer also produces an aqueous gelling agent with an unexpectedly high efficiency and high stability even in aqueous and especially acidic fluids. The effectiveness in gelling an aqueous fluid is indicated by a significant increase in viscosity such as at least a 10% increase when compared to similar polymers which are linear.

In addition, certain preferred classes of polymers have long term stability which means this effect will last even after 1000 pore volumes of a normally detrimental fluid has been flowed through the treated formation. This stability will be affected by the nature of the polymer and particular formation being treated. For example, in siliceous or anionic formations a cationic polymer is preferred and for cationic or neutral formations such as limestone or dolomite, an anionic or amphoteric polymer is preferred. For formations and/or which do not have a clear ionic character or where the ionic nature is weak, the stability or longevity can oten be improved by increasing the molecular weight of the polymer (e.g. crosslinking) and/or the length and number of branch chains.

Another preferred class of polymers has essentially a neutral, nonionic or amphoteric nature so that it is preferably weakly adsorbed on the host formation and/or other solids, e.g. suspended particulate solids. In addition, this polymer can solvate and/or swell with either aqueous or organic fluids depending on the exact hydrophilic-hydrophobic nature of the polymer to produce the desired resistance to flow. These polymers can be used for acidizing, fracturing, gravel or sand packing, shutting off fluids flowing in a formation, diverting fluids, drilling, well completion, grouting, flooding or tertiary recovery, or a combination thereof. They are especially useful for mobility control such as in polymer flooding and other enhanced recovery methods.

Specific uses of preferred classes of branched polymers include (1) water to oil ratio reduction (i.e., WOR) for wells, (2) reducing water flow, (3) enhancing the flow or production of hydrocarbons including oil, gas or mixtures thereof, either singly or in the presence of an aqueous fluid, (4) plugging off or diverting aqueous fluid flow in or into portions of a formation, (5) increasing viscosity and/or fluid loss control of fluids used in a well such as in carrier or treating fluids, gravel packing fluids, drilling, workover or completion fluids, (6) diverting flow of well or formation fluids, e.g., to alter mobility or injection profile or to control fluid injection, (7) reducing or increasing resistance to flow of aqueous fluids organic fluids, mixtures thereof or a component thereof in a formation, (8) increasing the viscosity of aqueous or organic fluids and especially as those fluids functions which the polymer can perform as shown in the following table.

| Characteristics Of Branched Polymers | | | | | | | |
|---|---|---|---|---|---|---|---|
| Polymer Attaching Portion | | Modifying Portion | | | Formation | | Function |
| Ionic Nature | Strength of Adsorption | Hydrophilic/ Hydrophobic | Ionic Nature | Solubility Nature of Polymer | Type | Major Ionic Nature | |
| Cationic | Strong | Hydrophilic | Ionic or nonionic | Aqueous fluids and/or polar solvents | Sandstone | Anionic | Decreasing water permeability, increasing oil flow or increasing aqueous fluid viscosity. |
| Anionic or Amphoteric | Moderate | Hydrophilic | Ionic or nonionic | Aqueous fluids and/or polar solvents | Limestone | Cationic | Decreasing water permeability, increasing oil flow or increasing aqueous fluid viscosity. |
| Cationic | Strong | Hydrophobic | Nonionic | Organic solvents | Sandstone | Anionic | Increasing water permeability or increasing organic fluid viscosity. |
| Anionic or Amphoteric | Moderate | Hydrophobic | Nonionic | Organic solvents | Limestone | Cationic | Increasing water permeability or increasing organic fluid viscosity. |
| Nonionic | Weak or None | Hydrophilic | Nonionic | Aqueous fluids and/or polar solvents | Sandstone or Limestone | | Increasing aqueous fluid viscosity or diverting aqueous fluid flow. | enter or encounter certain types of formations, (9) repelling certain fluids, salts, solids or materials of a formation or structure, or suspended in a fluid, (10) gelling aqueous fluids especially acidic fluids, (11) as carrier fluids for particulate solids, e.g., gravel packing, fracturing, acidizing, or a combination thereof, (12) clay stabilization, (13) as a flocculant for suspended particles, (14) treating surfaces to make them attract or repel aqueous or organic fluids or ionic materials, (15) as an acid extender or retarder, (16) fluid loss control and/or viscosifier for fracturing and/or acidizing, (17) preventing or breaking certain emulsions, especially water and hydrocarbon emulsions commonly encountered in formations, (18) forming an aqueous grouting gel around conduits such as pipelines, wells, tunnels, mine shafts, sewers, hydrocarbon storage caverns, (19) acting as a surfactant or bonding agent between solids and fluids; one or more fluid phases such as for increasing adhesion of resins or consolidating materials to certain surfaces; or one or more solid phases such as between solids suspended in a fluid and a formation, and (20) treatment of uncoated or poorly coated silica surfaces within a resin consolidation of solids (e.g. gravel packs, formation particulates and the like) to make resultant consolidation more resistant to water deterioration.

Thus, broadly speaking, one preferred application of this invention comprises one or more processes and polymer compositions for altering the surface characteristics of and/or fluid flow characteristics or a substrate or a formation which includes contacting said formation with a highly branched organic polymer which has an attaching portion and a modifying portion. The attaching portion of said polymer generally has ionic groups which establish the desired ionic bond or repulsion in the formation. The modifying portion of said polymer has the hydrophilic-hydrophobic balance desired to produce the desired formation surface characteristics and/or interaction with fluids such as gelling and increasing or decreasing permeability to certain fluids.

Preferred polymers can be classified according to the major characteristics of the formation to be treated or application, the type of polymer attaching or adsorption mechanism, the type of modifying polymer portion, polymer solubility or suspending characteristics and the In one preferred embodiment of this invention there is provided a simple one-stage, one phase, or one-agent treatment process for modifying the surface characteristics, wettability or fluid flow characteristics of an earthen formation especially a subterranean formation intersected by a well such as a producing oil or gas well. The treatment can also be applied by grafting or forming the branched polymer in situ. This treatment is essentially permanent and highly stable to acids, oxygen and temperatures up to at least 200°-350° F. For some preferred polymers even higher temperatures can be tolerated. Furthermore, the treatment is very stable in the presence of most electrolyte solutions such as salt or brine which normally affect other polymers (e.g., polyacrylamides and derivatives) previously used for such treatments. These acrylamide polymers tend to desorb or break down in the formation. In this treatment process, a certain class of branched organic polymers having a molecular weight in the range of about 900–50,000,000 are contacted or applied in a fluid carrier media, preferably an aqueous liquid phase, to the formation. The polymer carrier fluid can also be an emulsion, aqueous solution of inorganic salts, a hydrocarbon fluid, polar solvent such as polar and/or oxygenated hydrocarbons or mixtures thereof. The polymer has certain ionic and hydrophilic properties. Depending on the surface properties or wettability characteristics desired for the treated earthen or particulate formation, the polymer can be nonionic, amphoteric, neutral, anionic, cationic or a combination thereof. For treating most sandstone formations and especially subterranean oil producing formations, the cationic polymer is preferred. For some formations such as those having a high concentration of carbonate, the anionic polymer or amphoteric polymer is preferred. Where weak or reversible adsorbtion is preferred, nonionic polymers can be used such as for polymer flooding or in tertiary flooding to change the mobility ratio of fluid phases in the formation. The ionic polymer preferably has a calculated ionic concentration of about $5 \times 10^{-2}$-$1 \times 10^{-10}$ or preferably $5 \times 10^{-2}$-$1 \times 10^{-5}$ ionic sites per gram atom weight.

The ionic concentration of certain preferred polymers is calculated by adding the number of charges in the form of ionically charged atoms, radicals or groups including both the backbone chain, pendent groups and branch chain and then dividing that number of charges by the gram atom or molecular weight of the repeating polymer unit or representative portion of the polymer. This gives the number of charges per representative weight unit of the polymer. For example, polyethyleneamine with one nitrogen per each repeating polymer unit, e.g.

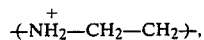

has one positively charged nitrogen or cation per repeating unit and a molecular weight of 44 which gives a charge density of 1/44 or about $2.3 \times 10^{-2}$. This does not include the counter ion ($A^-$). For polymers such as polyalkylamines the ionic charge or degree of ionization can be varied or changed by adjusting the pH, solvent or salts in the solvent. For ionic concentration calculation purposes, all atoms, radicals or groups which normally can be charged under some condition of use should be considered charged for the calculation unless adjustments to ionize some groups would deionize or interfere with others.

In another example of calculating charge density for a branched copolymer of units A, B and C, such as:

omer units for this backbone chain can be or contain aliphatic, aromatic, hetero groups, or combinations thereof. As used herein "homopolymer" means a polymer prepared by using monomers with a concentration of at least about 98% of one type of monomer, and copolymer covers polymers prepared using more than one type of monomer in concentrations of at least about 1%, i.e., significant portions. The term copolymer as used herein includes copolymers, terpolymers, etc., having 2–8 types of monomers in various concentrations or homopolymers where some monomeric units or polymer units have been derivatized such as hydrolyzed acrylamide. Both homopolymers and copolymers or portions thereof can be prepared in a one-step regular or a random polymerization of monomers, oligomers, polymers, or mixtures thereof or by multi-step polymerization of monomers, oligomers, prepolymers or mixtures thereof. The branched polymer can include randomly polymerized portions, regularly polymerized portions, block polymerized portions or combinations thereof. The branched polymer or portions thereof can be prepared by any one or more conventional batch or continuous polymerization processes or it can be polymerized in situ such as in an earthen formation where it is to be applied or used. The effectiveness of the branched polymer for a specific use, its structure and viscosity, the degree of branching, length of polymer chains and such are sensitive to polymerization conditions and the closeness of control of factors such as temperature, diluents

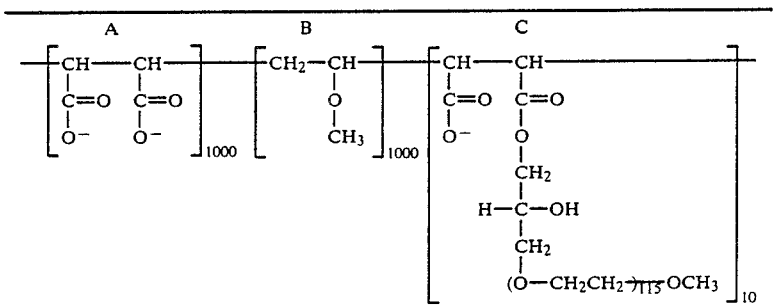

| CALCULATION OF GRAM ATOM OR MOLECULAR WEIGHT | | | |
|---|---|---|---|
| Polymer Unit | Molecular Wt of Unit | Number of Units | Weight of Units in Polymer |
| A | 114 | 1000 | 114,000 |
| B | 58 | 1000 | 58,000 |
| C | 5263 | 10 | 52,630 |
| | | | 224,630 |
| | | | average gram atoms or molecular weight. |

| CALCULATION OF NUMBER OF CHARGES PER UNIT | | | |
|---|---|---|---|
| Polymer Unit | Charges Per Unit | Number of Units | Number of Charges |
| A | 2 | 1000 | 2,000 |
| B | 0 | 1000 | 0 |
| C | 1 | 10 | 10 |
| | | | 2,010 |
| | | | Total Average Number of Charges |

Average charge concentration = 2010 charges/224,630
weight = $8.9 \times 10^{-3}$ charges per gram atom weight.

One preferred type of branched polymer has a substantially linear backbone having reactive sites on which branched chains can be attached. This substantially linear backbone can be a homopolymer or a copolymer with the reactive sites in the backbone chain or pendent groups. Substantially linear as used herein includes polymers having pendent groups which are not more than about two polymer units in length. The monor solvents, pressure, pH, electrolyte type and concentration, agitation, and other normal variables. Each branch chain can be substantially linear, highly branched itself or with the degree of branching desired as taught herein.

The stability of the branched polymer is a function of the polymer linkages and the environment to which they are exposed. The polymer should be stable to exposure to high temperature, acid, oxidation, hydrolysis and shear. For WOR applications high stability is desired. For other applications such as gelling acids the polymer need not be as stable over long periods of time. Preferred backbone linkages include C—C, C—N—C, C—O—C and combinations thereof. The stability of the branch chain and pendent group linkages is also critical and should have high stability for most applications. For altering fluid flow properties in formations, certain preferred branched polymers contain polyamine and polyether linkages in the branches. It is thought that the branching also increases the backbone stability of certain polymers such as those containing ester linkages. Certain preferred polymers having C—C linkage, ester linkage, and polyether branches have remained surprisingly effective at temperatures over about 177° C. This produces a high stability preferred polymer. With the carbon-to-carbon linkage, the ionic groups and hydrophilic or water solubilizing groups are in pendent groups or branch chains. For adequate water solubility there should be at least one ionic or hydrophilic group for about each five or six carbon atoms. That is, the carbon-to-hetero atom or group ratio should be less than about 7:1. The nature of the ionic or hydrophilic groups and type of carbon or hydrocarbon groups present will affect the solubility and ratio of carbon to hydrophilic groups. A preferred class of polymers is water soluble polymers; however, all polymers need not be water soluble depending upon their use or function. "Water solubility" as used herein means having a solubility of at least five parts per million (ppm), preferably about 1% by weight, in an aqueous fluid. For polymers to be ionically attached to a charged formation or structure being treated, the polymer must be at least dispersible in a fluid and at least partially ionizable in the presence of a solvent such as water, a polar solvent or mixtures thereof. It may be desirable to use hydrocarbon liquids, substituted or polar hydrocarbons such as oxygenated hydrocarbons. These hydrocarbon solvents include alcohols (methanol, ethanol, isopropanol), glycol ethers and ethylene glycol and the like. Easily gasified carrier fluids useful herein include but are not limited to carbon dioxide, ammonia, nitrogen, low molecular weight hydrocarbons or substituted hydrocarbons. These materials can also be used as an easily gasified component of a liquid system or as a principle component of a mist or foam carrier. These fluids can be used as solvents, carrier fluids, preflushes, afterflushes or a combination thereof to place or suspend the polymer. The degree of branching, crosslinking, molecular weight and stereo configuration must also be considered along with the chemical constituents, e.g. hydrophilic groups and ionic nature, to determine the solubility, attraction, repulsion, suspension, adsorption and other properties which determine the strength of attachment to the formation or suspension in a fluid, as well as the fluid properties including adsorption, hydration and resistance to or promotion of fluid flow for either aqueous or organic fluids. For some applications it may be desirable to have a polymer or portions thereof that repels, suspends or disperses solids, the surrounding formation and/or other polymer chains. A high molecular weight polymer with a high concentration of hydrocarbon groups would tend to produce a high viscosity fluid and be less soluble in aqueous fluid. This polymer could also be soluble or dispersible in organic fluids. A high concentration of hydrophilic groups would tend to increase water solubility, hydration or solvation. It is believed that for a certain molecular weight, a highly branched hydrophilic polymer would tend to capture or influence more water than a more linear hydrophilic polymer and it would more effectively hydrate or swell to increase the viscosity of an aqueous fluid in which it was dissolve or with which it became associated while attached to a formation or structure. That is, the random branched polymer would have a larger hydrodynamic volume or associate with more water and be more effective to reduce aqueous fluid flow. However, a polymer with longer hydrophilic branches would be more effective for gelling aqueous fluids or reducing WOR than one with shorter branches, especially in high permeability formations or those having larger pores.

For high aqueous fluid solubility polymers or those with high ionic concentration, it is desirable to have hetero atoms or groups such as nitrogen, oxygen, phosphorous, sulfur, carboxyl, carbonyl, carbinol, cyano, ether, acetal, carboxyamide, alkylidene, alkylene, or substituted aromatic groups in the branched polymer. The first eleven atoms and groups are preferred. The hetero groups and branch chains should be selected for the stability desired. They can also be arranged to decrease stability of the polymer for some applications such as by hydrolysis, attack by acid or oxygen, or thermal decomposition.

In one method of preparing the branched polymer, the backbone chain must contain reactive sites which will react with a corresponding reactive site in the monomer or in the branch chain to be attached. The branching can also be accomplished by homopolymerization where the monomer reacts with other monomers, oligomers or polymers to randomly form branches or a branched polymer as in the case of certain alkyleneimines (e.g. an aziridene to produce PEI) in which the alkylene group preferably contains about 2-3 carbon atoms. In another method, the branch chain can be attached to a monomer unit and then one type or a mixture of monomers are polymerized to form the backbone chain, branch chain or both. The branching can also be accomplished by reacting with or grafting a branch polymer chain onto a linear backbone chain, a slightly branched backbone chain or a backbone chain having pendent groups. The branch chain can be attached through corresponding reactive sites to the linear backbone chain or to what might be considered a pendent branch or a pendent group of the branch chain. After the branch chain or branch chain monomers are attached, the reactive site can be considered no longer reactive. As with the backbone chain the branch chain or pendent groups can contain, but are not limited to, hereto atoms or groups such as oxygen, nitrogen, phosphorus, halides, hydroxyl, carbinol, acetal, hydroxy, alkoxy, alkepoxy, carboxyl, ester, keto, cationic salt, amide, amine, imide, imine, other nitrogen groups, similar sulfur groups, unsaturated and cyclic carbon-to-carbon or carbon-to-hetero atom linkages. The term "hetero" also includes metals such as the alkali metals (Group IA), alkaline earth metals (Group IIA) and metals of Group III, IV, V and VIII of the Periodic Table such as lithium, sodium, potassium, copper, rubidium, silver, cesium, magnesium, calcium, zinc, strontium, cadmium, barium, aluminum, titanium, zirconium, cerium, molybdenum, lead, vanidium, arsenic, antimony, bismuth, chromium, tungsten, manganese, iron, cobalt, nickel, and combinations thereof. The branched polymer can also be made by reacting or polymerizing one or more monomers onto reactive sites in or on the backbone chain to produce random length branches at various locations on the backbone polymer and/or on various branch chains.

In one method the reactive sites in the polymer backbone chain, branch chain or monomer can be any atom, radical or group which will react with a corresponding reactive group in the backbone chain, branch chain or monomer to attach the branch chain to the backbone chain. In forming, branching or grafting the polymer, there must be at least one reactive site in the backbone chain to attach a branch chain but there may be one or more reactive sites in the branch chain as long as crosslinking is not a significant problem. The reactive site or sites can be considered a branching agent. The branching agent can also be a complete monomeric or polymeric unit having one or more reactive sites which will react or polymerize to form the branched polymer of this invention or a portion thereof. Especially for in situ grafting or polymerization, the branching agent would be considered a monomer, oligomer or polymer and not merely the reactive site or group such as epichlorohydrin attached to the branching or crosslinking polymer. Some crosslinking can be tolerated and in special cases such as low ionic attraction, high formation porosity, and high temperature environment, extensive crosslinking along with the branching is helpful for stability and effectiveness, especially for WOR reduction, grouting, diverting flow, etc. The resulting polymer should still be water soluble.

The reactive sites can be selected from one or more of the following chemical groups to react with a corresponding reactive site: (1) alcohol, (2) aldehyde or ketone, (3) alkene, (4) alkyl halide, (5) alkyne, (6) amine, (7) an acid or acid equivalent including an ester, anhydride or an acyl halide, (8) amide, (9) epoxide, (10) acetal or ketal, (11) nitrile, (12) sulfides and similar or equivalent reactive groups.

It is recognized that the effectiveness of branched polymers in reducing water flow and/or altering aqueous fluid properties appears to encompass several molecular variables. Particular characteristics may be constructed into the branched polymers to satisfy different applications such as degree of branching, length of branches, ionic nature of backbone and branches, molecular weight of backbone and branching, and degree of crosslinking.

For attaching the polymer to particulate solids, generally it is preferred that the predominant ionic charge on the surfaces of a substrate or solids be reacted with a branched polymer which possesses opposite ionic charges in the backbone structure; however, workability is not limited to this mechanism. Higher molecular weight branched polymers also tend to adhere to surfaces which can possess the same predominant surface charge as the polymer. Some degree of crosslinking of the branched polymers also tend to increase this molecular weight and impart this improved property. The mechanism(s) involved in coating these surfaces is not fully understood.

Greater efficiency in reducing water permeability is related to a higher degree of branching and with the higher molecular weight hydrophilic branches and backbone structure. Some crosslinking can be advantageous since the molecular structure is enlarged. However, sufficient open ended branches are necessary to effect the reduction in water production and/or mobility.

For attaching to predominantly anionic sandstone (silica) formations, certain preferred polymeric structures should contain sufficient cationic (+) sites to cause strong attraction of the polymer to sandstone surfaces or other particulated solids (anionic surface properties). These strongly cationic polymers also will stabilize clays and fines within a surface or subterranean structure while imparting desirable properties (aforedescribed) in the formation or particulated solids. These polymers stabilize sensitive formations such as those containing clay so that they are less sensitive to swelling, dispersion, erosion or other damage from fluids such as hydrocarbon fluids (especially gas), aqueous fluids or other formation fluids which can result in migration, plugging or other types of damage which reduce permeability. These polymers also increase the stability of a resin consolidated formation. These polymers can also modify the surface characteristics of particles such as sand, silica flour, asbestos and the like.

In another situation it is desired that predominately cationic particulated solids composed of calcareous components (cationic (+) surfaces) e.g., $CaCO_3$, $CaMg(CO_3)_2$ (dolomite), $FeCO_3$ (siderite, etc.) be treated with polymers containing a sufficient quantity of anionic (−) sites to result in strong attraction of the polymer to the solids. Limestone formations represent the above described calcareous structures.

Formations often contain particulated solids of varying or mixed compositions and ionic surface properties. The formations may be treated separately with two or more polymeric types; for example, one treatment may involve a cationic (+) polymeric structure to promote attraction to the anionic (−) (sand, clays, silica, etc.) surfaces. A simultaneous subsequent treatment with a polymer containing anionic sites can be used to cause strong attraction to the cationic surfaces. The above example describes one method of treating a formation of differing ionic surfaces. Branched polymers with different ionic groups or mixtures of different ionic properties can also be used on formation with one predominant ionic character. Alternately, a polymer of this invention may contain anionic, cationic or other types of ionic groups, portions or segments so that formations of mixed compositions or several formations of varying nature can be treated with one type of polymeric material in one or more steps or applications. However, the scope of this invention is to include other procedures and modifications which represent the basic concept as taught.

For some applications, it is desired that the polymeric molecules be characterized by little or no chemical crosslinking of polymeric segments. Some crosslinking may be desired in other areas. The polymers must possess sufficient hydrophilic properties to cause some thickening of aqueous fluids. Generally, for a given branched polymer family it has been observed that polymers having higher viscosity are more effective than those of the same family having lower viscosity at the same concentration.

For certain preferred polymers, the backbone, if definable, may be linear, branched, irregular shaped, or otherwise and can be composed of a homopolymer or copolymer structure. Sufficient reactive sites must be available on the backbone for chemically attaching desirable polymeric chains. Side chains may also be represented by a homopolymer or copolymer structures and may take on a linear, branched, irregular shaped or other type configuration. The branch chain can also be attached to pendent groups of a polymeric backbone. The resulting polymeric structure must contain the necessary ionic charges, flexibility and balance to facilitate strong and long lasting ionic bonding between it and the particulated solids. It should provide adequate hydrophilic (water loving) segments of sufficient ionic nature to cause significantly effective resistance to the flow of aqueous fluids through porous media while causing little or no resistance to flow of hydrocarbons therethrough. The polymeric material may also impart long lasting surface properties to the particulated solids such as causing enhancement of oil flow by increasing the oil permeability. Polymeric structures should possess the following additional properties. The ionic characteristic of the polymer may be one or more types, e.g., a polymeric molecule may possess only cationic properties whereas another polymeric structure may contain nonionic, cationic, anionic, neutral, amphoteric segments or combinations thereof. Ionic interference or interaction within the polymer or between polymers may cause problems with different types of ionic segments.

For one preferred class of highly branched, water soluble cationic polymers, the backbone will contain the cationic groups or radicals and the branched chains can contain additional groups, amphoteric groups, nonionic groups and/or be a neutral group. For substantially linear backbone chains, the molecular weight of the backbone should be in the range of about 1000–5,000,000.

The polymer unit of the branch chains can be one or more of the polymer units given for the polymer backbone chain. As indicated above the branch chains can contain the same polymer units for randomly polymerized homo or copolymers. For randomly polymerized backbone chain, branch chain or both, the polymer chain can be selected arbitrarily so that even the branch chains would have branches. For graft polymerization or separately attaching the branch chain to a backbone chain, the branch chain can also have several branches attached through one or more reactive sites. The branch chains can also comprise different random polymer units which can be made up of one type of repeating unit or one or more different repeating units. Branch chains can also be graft polymerized onto the polymer backbone chain as a separate polymerization step. More than one type or length branch chain can be grafted to the backbone chain. The branch chain can also be another homo or copolymer chain containing a reactive site which will attach to a corresponding reactive site in the backbone polymer chain. The molecular weight range of these branch chains can be about 100–5,000,000 or preferably about 300–1,000,000 for water soluble WOR reduction or aqueous fluid gelling polymers.

The polymer chain can contain hydrophilic or hydrophobic groups, oleophilic or oleophobic groups, hetero groups and/or ionic groups including amphoteric, nonionic. cationic, neutralized or anionic. Either the polymer backbone or branch chain or both can include ionic groups. The number or concentration of each of these groups, their location and the surrounding media, solvent or fluid will determine the net or overall properties and effect of the branched organic polymer. The branched polymers of this invention can be prepared by conventional methods as described in the references cited and incorporated herein. The backbone chain, branch chain or both can be regular homo polymers, random copolymers of two or more monomers, block copolymers, segmented random copolymers or combinations thereof.

The branched polymers of this invention can have a molecular weight in the range of about 900–50,000,000. The molecular weight is generally not critical except for a minimum value for each polymer family depending on the application and other polymer characteristics such as degree of branching, ionic nature, degree of crosslinking, as well as the effectiveness and stability desired. Generally, the higher the molecular weight, the more effective the polymer is for increasing viscosity or reducing permeability to fluid flow. Polymers having a molecular weight near the lower critical limit for a given application may be effective for a short time but are usually less stable to detrimental fluid flow or adverse conditions. A higher degree of branching and/or crosslinking generally makes the lower molecular weight polymers more effective for most applications. Preferred classes of branched polymers have an average molecular weight of about 100,000–5,000,000 for most applications; higher aqueous viscosities are produced with molecular weights up to about 10,000,000–15,000,000. Polymers having molecular weights of about 10,000–2,000,000 are effective for several uses and are easier to handle than higher molecular weight polymers. For certain applications where high viscosity or effectiveness is not critical, or for less permeable formations, lower molecular weight polymers such as about 1,000–9,000,000 can be used. Some polymers can also be used and branched or crosslinked in situ for easier handling and/or greater effectiveness.

The backbone polymers can have a molecular weight of about 800 to nearly 50,000,000; preferably about 1,000–5,000,000 for WOR reduction; and about 10,000–10,000,000 for use as an aqueous viscosifier or fluid loss control agent. These backbone polymers can be used to produce branched polymers having a molecular weight of about 9,000–9,000,000; about 100,000–20,000,000; or even higher than 50,000,000 depending upon the number and size of branch chains attached and the degree of crosslinking, if any.

The branch chains can have molecular weights up to about one million or even higher, generally if the chain is highly hydrophilic and highly branched itself. One class of preferred branch polymers, before attaching to the backbone, have molecular weights of about 300–50,000. For greater WOR effectiveness, higher molecular weight and a higher degree of branching are preferred, even up to a molecular weight of about 100,000 or even about 1,000,000.

With more soluble, more highly branched or compact polymers, higher molecular weight polymers are preferred since they are generally more effective and can be acceptably handled. Crosslinking, either in the preparation or in situ, can in effect increase the branched polymer molecular weight. This crosslinking can occur in batch or continuous preparation of the branched polymer or in situ when the branched polymer is applied to a formation. The degree of crosslinking will limit the degree of water solubility or water dispersibility since the polymer tends to become less soluble or dispersible and form a more rigid gel structure with increased crosslinking. The gel structure is desirable for some applications such as plugging formations or grouting voids or high permeability zones around conduits such as wells, caverns, tunnels, pipelines, and the like. The limiting factor on molecular weight of the backbone polymer, branch chain polymer and/or resulting branched organic polymer is the maximum fluid viscosity which can be handled in making, mixing and placing the components and/or resulting polymer.

The polymer branched chains can be any polymeric group having the desired hydrophilic-hydrophobic properties and a reactive group which will connect with the reactive sites on the backbone chain. The reactive group will preferably be on or near one end of the branch chain but it can be anywhere in the chain or in a pendent group. For one preferred class of polymers used to reduce the flow of water through earthen formations or to reduce the production of water in an oil well, the branched chain and overall polymer should be hydrophilic with the branched chain having from about 2–50,000 repeating polymer units. These branch chains can be substantially linear or branched themselves. In some cases multi- or difunctional branched polymers can be used having terminal reactive groups if one reactive group can be capped or inactivated to prevent or reduce crosslinking. Some crosslinking, for example about 5%, can be tolerated and is advantageous for certain applications. Several preferred groups of branched polymer chains are the polyalkylene imines and polyalkylene oxides in which the alkylene radicals contain from about 1–3 carbon atoms. Examples of other monomeric units which can be used to form the branched polymer chains are acrylamide, acrylate, vinyl alcohol, vinyl ethers, hexoses, allyl alcohols, allyl amines, substituted derivatives thereof such as sulfonated acrylamide, as well as copolymers and combinations thereof. Generally monomers, polymers and polymer units which can be used for the backbone chain can be used for the branch chain.

For one type of preferred hydrophilic branched polymers useful for viscosifiers, decreasing WOR or decreasing the flow of aqueous fluids in, into or within a formation, the predominant ionic groups preferably in or near the backbone chain will be cationic groups. The preferred polymer branch repeating units will be $+CH_2-CH_2-O+$, $+CH_2-CH_2-NH+$, $+CH_2-CH_2-N+$ or combinations or substituents thereof. These preferred polymer units can be written $-R-X-$ wherein R is defined as herein and X represents a hetero group such as nitrogen, oxygen, or sulfur having at least two bonds. The R group shown above is $C_2$ alkyl radical ethylene. X can also be another R group, non-existent or within the R group. These chains will preferably be monofunctional or more reactive at one end such as being capped or terminated on one end by a relatively nonreactive group and on the other end by a branching agent. These $-R-X-$ groups can be acrylate, acrylamide, vinyl alcohol, methyl vinyl ether, a $C_1$–$C_6$ alkyl, aryl, combinations thereof, or combinations thereof with hetero groups, especially through a hetero atom as given above such as $C_1$–$C_6$ alkyl with hetero groups. Examples of preferred terminal groups are alkoxy (e.g. $-OCH_3$, $-OCH_2-CH_3$); aroxy

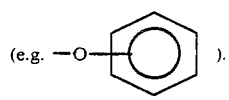

Commercially available monomers, equivalents or polymers containing them (either homopolymers or copolymers) which can be used for the branched polymers (either in the backbone, branch or both) of this invention are acrylic acid; acrylic esters; methacrylic acid; methacrylate esters; maleic anhydride; itaconic acid; 2-acrylamido-2-methyl propane sulfonic acid; acrylonitrile; sodium vinyl sulfonate; sodium styrene sulfonate; dimethylaminoethyl methacrylate; allyl sulfonate; vinyl acetate; methacryloyloxyethyltrimethyl ammonium methosulfate; alkenes; vinyl acetamide; vinyl ethers; vinyl phosphonates; vinyl phosphates; vinyl phosphines; diethylaminoethyl acrylate; 3-methacryloyloxy-2-hydroxy-propyl trimethylammonium chloride; 4-vinyl pyridine; 2-vinyl pyridine; N-methyl-5-methyl-2-vinyl pyridinium methosulfate; 1,1-dimethyl-1-(2-hydroxypropyl)-amino methacrylamide; dimethyldiallylammonium chloride; diallyl-amine; triallyl amine; methyldiallyl amine; diallyl ammonium salts; betaacryloyloxyethyldimethyl sulfonium methosulfate; ethylene oxide; propylene oxide; N,N-disubstituted methacrylamides; N-substituted methacrylamides; methacrylamide; N,N-disubstituted acrylamides; N-substituted acrylamides; N-vinyl pyrrolidone; acrylamide; diacetone-acryl amide; ethyleneimine; propylenimine; ethylene chloride reacted with ammonia; 1-vinyl-2,3-dimethylimidazolinium methylsulfate; N-vinylimidazole; glycidyl alcohol; epichlorohydrin; glycidyl methacrylate; vinyl carbonate; allylglycidyl ether; isoprene and chloroprene.

Conventional methods of polymerization, grafting or branching, and handling can be used to prepare and apply the polymers of this invention in view of this disclosure and the references cited herein. Typical polymers, polymerization techniques and methods of application are described in the following U.S. patents and other patents cited here: U.S. Pat. No. Re. 29,595 to Adams et al; U.S. Pat. No. 2,223,933 to Garrison; U.S. Pat. No. 2,331,594 to Blair; U.S. Pat. No. 2,345,713 to Moore et al; U.S. Pat. No. 3,500,929 to Eilers et al; U.S. Pat. No. 3,822,749 to Thigpen; and U.S. Pat. No. 4,058,491 to Steckler which are incorporated herein by reference to the extent necessary. One preferred method for formulating one cationic branched polymer of this invention is the solvent method using an aqueous media containing a high concentration of electrolyte such as an alkali metal halide, preferably sodium chloride or potassium chloride. In this preferred method, the reaction conditions, time and agitation should be controlled to produce the branched polymer of the desired molecular weight and structure without unduly mechanically shearing the polymer chain or interfering with the reaction. For higher degrees of agitation the reaction time should be lengthened to produce the desired polymer size and structure. The molecular weight, structure and effectiveness of the resulting branched polymer for a particular use are sensitive to reaction conditions and conditions to which the polymer is exposed, including pH, temperature, pressure, time, contaminants, solvents or diluents, electrolyte, concentration, agitation, and other typical variables. Typical proceedures are given in more detail herein as Proceedures. The references previously cited and incorporated by reference also describe various aqueous and organic solvents and emulsion techniques which can be used.

The polymers used in this invention can be applied to most particulate solids or formations by either spraying, pouring or applying the polymer directly to the formation or particles. The polymer can be placed in a suitable liquid phase or media adjacent the formation to be treated and allowing, forcing, injecting or pumping the liquid phase into the formation so that the polymer contacts or treats the formation or the desired portion of the formation to alter the wettability or surface characteristics of the formation as desired. Particulate material (e.g. sand, silica flour and asbestos) can also be added to or suspended in the polymer or a fluid containing the polymer. For an oil well this can be simply done by placing an aqueous, organic or mixed liquid phase containing the polymer adjacent the formation to be treated and displacing or forcing the liquid phase containing the polymer into the formation. The carrier fluid can be one or various mixtures of gas, liquid or solids such as foams, emulsions or slurries. The treatment of a subterranean formation through an oil well can be accomplished using one or more liquid spacers, preflushes or afterflushes such as a dilute salt solution, preferably ammonium halide and/or an aqueous alkali metal halide solution, into the formation to pretreat or clean the formation, then injecting the liquid phase containing the polymer in a concentration of up to about 10%, preferably 0.005 to 1.0%, in the quantity calculated to contact the desired portion of the formation with the liquid phase and highly branched ionic polymer. In some cases a preflush, containing an extending agent such as a surfactant, a nonionic polymer or an ionic linear polymer which will be adsorbed on the formation, can be used to allow displacement of the branched treating polymer away from the well bore or formation surface. This preflush in effect ties up the ionic sites in the formation and allows the branched polymer to pass through this zone with minimal treatment by the branched polymer. This zone treated with an extending agent would normally have high permeability to water. The branched polymer would then treat the adjacent formation zone. This would leave a zone having high permeability to water between the branched polymer treated zone and the well bore. This in effect would increase the effective radius or bore of the branched polymer treated zone around the well. The polymer can be in a liquid phase which is aqueous, organic or a substituted hydrocarbon such as an alcohol, ester, ether, ketone, aldehyde, amide, or an emulsion or mixture of two or more of these liquid phases with water or another organic liquid. A foamed carrier can also be used. The carrier or other fluid phases can be acidic, basic or neutral. Acids or acidic carrier fluids can also be used.

Optionally, the polymer can also be carried in aqueous acid or salt solutions. A preferred acid carrier can contain up to 37% acid, such as mineral acid, organic acid or mixtures thereof, for example, hydrochloric, hydrofluoric, acetic, fumaric and the like. Other preferred acid concentrations are: for fracture acidizing up to about 28% or 15-28%; for fracture acidizing with proppant such as sand, 3-5%; and for use with WOR control treatments 0-5%. A preferred aqueous acidic carrier should have a pH adjusted below about 7 or 6.5 with a suitable mineral or organic acid or equivalent such as hydrofluoric, hydrochloric, nitric, sulfuric, phosphoric, acetic, formic, hydroxyacetic, sulfamic, citric, fumaric, oxalic, and sodium dihydrogen phosphate. Acid producing compounds, equivalents or precursors can also be used such as ammonium bifluoride, acetic anhydride, and methyl formate. For higher concentrations of certain polymers, high viscosity and pumping pressure may be a problem. The carrier fluid can contain one or more acids, diluents, solvents or other liquid phases as carrier fluid or injected in sequence with the carrier. When the branched polymer is mixed with an acid or acidic fluid the mixture can be used for one or more of several functions such as fracturing, acidizing, acid fracturing, or removing unwanted material such as scale, carbonates, rust and other plugging material from wells, tubular goods, a formation, or process equipment. In some cases the branched polymer could be fashioned to treat the cleaned surfaces as well as a particulate formation. This branched polymer treatment can also serve to reduce deposition or formation of certain detrimental materials such as paraffin, scale, carbonate, rush and the like. Some branched polymers also serve to extend or retard the acids or in other words the polymer extends the time required for a given concentration of acid to react with a given amount of substrate. This would permit injection of an acid containing the polymer deeper into a formation before the acid was spent or would permit a reaction with material deeper in the formation. The carrier liquid can also be either a water-in-oil or oil-in-water emulsion and the carrier fluid may contain optional ingredients such as particulate material as used in fracturing, surfactants which are compatible with the polymer, inhibitors and diverting agents. The polymers can be applied, mixed with other polymers or additives, so that more than one treatment is performed concurrently. Since certain preferred polymer treatments are substantially permanent and stable to brine and most acids, these polymer phases can be displaced from the well bore or displaced within the treated formation using additional carrier fluid, acids, aqueous or organic phases. In addition, the treatment may be conducted in one or more treatment phases with various spacer fluids or other types of treatment fluids between the liquid phase containing the polymer.

For use in well fluids such as for drilling, completion, testing, cementing or cementing compositions, one preferred carrier is an aqueous fluid. This fluid preferably has a basic pH or a pH greater than about 6.5 or 7 and preferably above about 10 or 12. The pH of most Portland cement compositions is above about 12. In these fluids the branched polymer can serve to treat formations contacted by the fluid or to treat the fluid itself (e.g., reduce fluid loss, increase viscosity of the fluid and gel the fluid).

Polymer units which can be used for the branched polymers of this invention can be generally any type of polymer unit that can be connected to other polymer units of the same or a different type to form a branched water soluble polymer. More particularly, polymer units can be made or derived from one or more of the classes consisting of (1) vinyl monomers or diene monomers which produce a chain with carbon-to-carbon linkage which can contain a double bond; (2) diallylic monomers which can produce a cyclic or hetero cyclic portion in the polymer chain; (3) imine or amine type monomers which result in nitrogen atoms in the polymer chain; (4) amide type monomers which include nylon and protein type polymer units; (5) saccharide monomer units, polymers of and derivatives thereof which include the starches, guars, xanthan gum polymer, cellulose and derivatives thereof; (6) ethers and sulfides which include oxygen and sulfur in the polymer chain; (7) carbonates which include the carbonate group in the polymer chain such as either in a linear chain or in a pendent group; and (8) urethanes which include the urethane linkage in the polymer chain either in a linear chain or in a pendent group. These polymer units can be present as a predominant class or combined in regular, random, block or other various combinations. With polymer units which are less soluble than desired in a particular fluid other polymer units, substituents, certain branch chains or a combination of these can be used to produce the desired solubility and overall polymer characteristics required for the intended use. However, the polymers of this invention include those wherein a significant portion (at least about 0.1% and preferably 1%) of the branched polymer units are defined by the above classes or at least one formula set forth herein. The above polymer units can be represented or illustrated by one or more of the structural formula set forth herein.

Class I: vinyl or diene polymer units can be defined as:

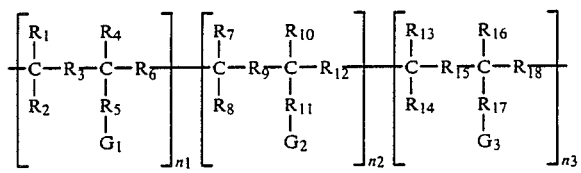

wherein $R_1$, $R_2$, $R_4$, $R_7$, $R_8$, $R_{10}$, $R_{13}$, $R_{14}$ and $R_{16}$ are independently hydrogen, alkyl, alkenyl, alkynyl, aryl, acyl, cyclic hydrocarbon, heterocyclic hydrocarbon, hydroxyl, carboxyl, carbonyl, $-OR_{19}$, $-NR_{19}R_{20}$, $-SR_{19}R_{20}{}^+$, $X_4$, or combinations thereof which also can contain oxygen, nitrogen, sulfur or phosphorous;

wherein $X_A$ is $-Cl$, $-Br$ or $-NO_2$;

wherein $R_3$, $R_5$, $R_6$, $R_9$, $R_{11}$, $R_{12}$, $R_{15}$, $R_{17}$ and $R_{18}$ are independently non-existent or alkyl, alkenyl, alkynyl, acyl, aryl, carbonyl, carboxyl, aromatic hydrocarbon, cyclic hydrocarbon, heterocyclic hydrocarbon, or combinations thereof which can also contain oxygen, sulfur, nitrogen or phosphorous;

wherein $R_{19}$, $R_{20}$, $R_{21}$ and $R_{22}$ are independently non-existent, hydrogen, alkyl, alkenyl, alkynyl, aryl, acyl, cyclic hydrocarbon, heterocyclic hydrocarbon, or combinations thereof which can also contain oxygen, sulfur, nitrogen or phosphorous;

wherein $R_{23}$ is independently in each position hydrogen, alkyl, alkenyl, alkynyl, aryl, acyl, cyclic hydrocarbon, heterocyclic hydrocarbon, $M^{+1}$, $M^{+2}$, $M^{+3}$, $M^{+4}$, $^+NR_{19}R_{20}R_{21}R_{22}$, or combinations thereof which can also contain oxygen, nitrogen or phosphorous;

wherein $R_{24}$ is independently in each position alkyl, alkenyl, alkynyl, aromatic hydrocarbon, or combinations thereof which can also contain oxygen, sulfur, nitrogen or phosphorous wherein $R_{24}$ has two or more atoms bonded together with the nitrogen to form a ring;

wherein M is independently in each position ammonium, substituted ammonium, a metal ion or a mixture thereof;

wherein $G_1$, $G_2$, and $G_3$ can be independently non-existent hydrogen, $-SO_3R_{23}$, $-OSO_3R_{23}$, $-PO_3R_{23}R_{23}'$, $-OR_{23}$,

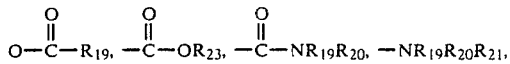

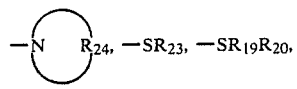

or combinations thereof;

wherein $n_1$, $n_2$ and $n_3$ are independently integers of about 0-500,000 where $n_1+n_2+n_3 \geq 3$;

wherein each hydrocarbon radical independently contains 0-10 carbon atoms and optionally 0-4 hetero groups of oxygen, sulfur, nitrogen or phosphorous; and wherein the radicals attached to each atom and the structural formula balance the bonds of that atom.

As used herein, any unspecified bond or radical can be hydrogen, a double bond, a cyclic bond or where appropriate one of the other structures described herein. The radicals or groups having a prime number designation (e.g., $R_{19}'$; $R_{20}'$; etc.) are independently defined the same as for the same radical or group with the unprimed base number. In view of this disclosure, one skilled in the art will know which radicals, bonds and structures are appropriate or can be possible for each combination to form a stable polymer configuration. For example, the structural formula of each polymer unit, radical or group can have internal atoms or radicals, internal bonds, more than one bond or different types of bonds to balance the bonds of adjacent units, radicals or groups. Stability as used here merely means that the structure and/or combination is possible or is one definition and not that the structure must be capable of proof or isolation. Substituted ammonium as used herein is defined as $^+NR_{19}R_{20}R_{21}R_{22}$. M as used herein refers to a cation and A refers to an anion whose charge can vary from about 1–4.

Class II: diallylic polymer units can be defined as:

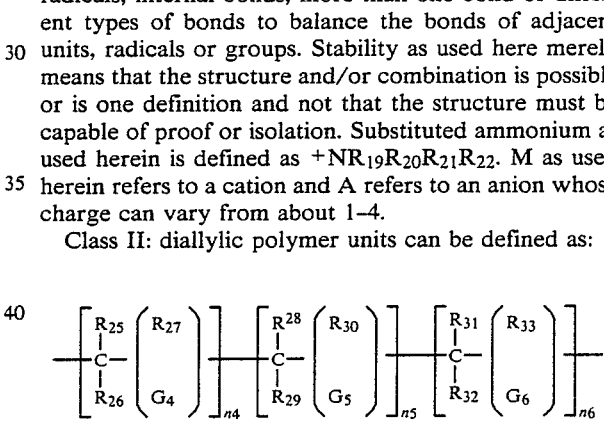

wherein $R_{25}$, $R_{26}$, $R_{28}$, $R_{29}$, $R_{31}$ and $R_{32}$ are independently defined as $R_1$;

wherein $R_{27}$, $R_{30}$ and $R_{33}$ are independently alkyl, alkenyl, alkynyl, aromatic hydrocarbon, or combinations thereof which can also contain oxygen, nitrogen, sulfur or phosphorous with each of these R groups being two or more atoms bonded together with G group shown to form a ring;

wherein $G_4$, $G_5$ and $G_6$ are independently

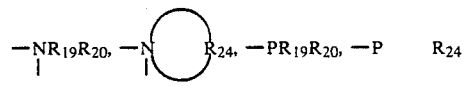

with $R_{19}$, $R_{20}$ and $R_{24}$ are the same as previously defined herein;

wherein $n_4$, $n_5$ and $n_6$ are independently integers of about 0-500,000 where $n_4+n_5+n_6 \geq 3$; and wherein the other appropriate conditions of Class I apply to Class II polymer units.

Class III: imine or amine type polymer units can be defined as:

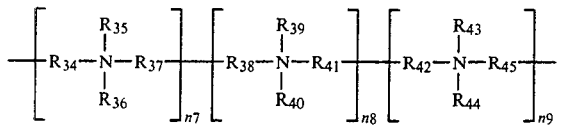

wherein $R_{34}$, $R_{37}$, $R_{38}$, $R_{41}$, $R_{42}$ and $R_{45}$ are independently defined as $R_3$;

wherein $R_{35}$, $R_{36}$, $R_{39}$, $R_{40}$, $R_{43}$ and $R_{44}$ are independently hydrogen, alkyl, alkenyl, alkynyl, aryl, acyl, carboxyl, carbonyl, cyclic hydrocarbon, heterocyclic hydrocarbon, $-OR_{23}$, $-NR_{19}R_{23}$, $-SR_{23}$, $-SR_{19}R_{23}{}^+$, $X_A$, or combinations thereof which can also contain oxygen, nitrogen, sulfur, or phosphorous with $R_{19}$ and $R_{23}$ the same as previously defined herein;

wherein $n_7$, $n_8$ and $n_9$ are independently integers of about 0–500,000 where $n_7+n_8+n_9 \geq 3$; and wherein the other appropriate conditions of Class I apply to Class III polymer units.

Class IV: amide type polymer units can be defined as:

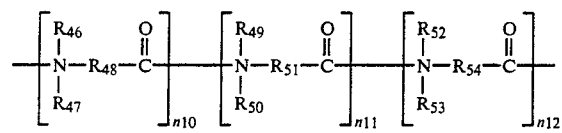

wherein $R_{46}$, $R_{47}$, $R_{49}$, $R_{50}$, $R_{52}$ and $R_{53}$ are independently defined the same as $R_1$ except for $-OR_{19}$, $-NR_{19}R_{20}$, $-SR_{19}$, $-SR_{19}R_{20}{}^+$, and $X_A$; and they can be independently non-existent;

wherein $R_{48}$, $R_{51}$ and $R_{54}$ are independently defined the same as $R_3$, provided however all three R groups cannot be non-existent;

wherein $n_{10}$, $n_{11}$ and $n_{12}$ are independently integers of about 0–500,000 where $n_{10}+n_{11}+n_{12} \geq 3$; and wherein the other appropriate conditions of Class I apply to Class IV polymer units.

Class V: saccharide and saccharide derivative units can be defined as:

wherein the other appropriate conditions of Class I apply to Class V polymer units.

As shown above conventional chemical terminology applies so that carbon atoms are indicated at the intersection of lines of the six-membered rings except where the oxygen (O) atom is indicated. No specific stereochemistry or stereostructure is meant to be implied by the structural formula herein. In other words, the structural formula shown is meant to cover all applicable variations and equivalents.

Class VI: ethers and sulfide polymer units can be defined as:

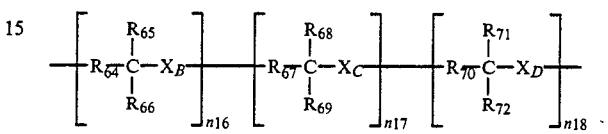

wherein $R_{64}$, $R_{67}$ and $R_{70}$ are independently defined the same as $R_3$;

wherein $R_{65}$, $R_{66}$, $R_{68}$, $R_{71}$, and $R_{72}$ are independently defined the same as $R_1$ except for hydroxyl;

wherein $X_B$, $X_C$ and $X_D$ are independently oxygen or sulfur;

wherein $n_{16}$, $n_{17}$, and $n_{18}$ are independently integers of about 0–500,000 with $n_{16}+n_{17}+n_{18} \geq 3$; and wherein the other appropriate conditions of Class I apply to the Class VI polymer units.

Class VII: carbonate polymer units can be defined as:

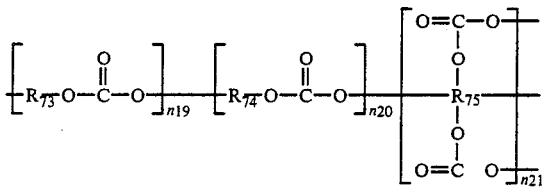

wherein $R_{73}$, $R_{74}$ and $R_{75}$ are independently defined the same as $R_3$;

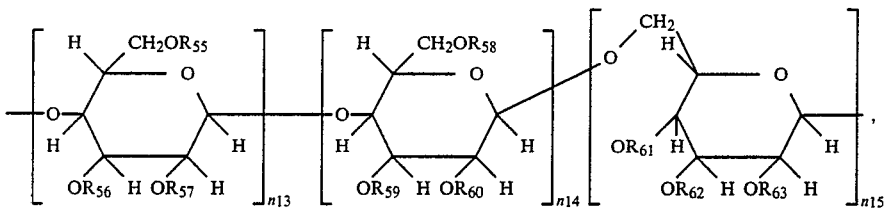

wherein $R_{55}$, $R_{56}$, $R_{57}$, $R_{58}$, $R_{59}$, $R_{60}$, $R_{61}$, $R_{62}$ and $R_{63}$ are independently hydrogen, alkyl, alkenyl, alkynyl, aryl, acyl, carboxyl, carbonyl, cyclic hydrocarbon, heterocyclic hydrocarbon, $M^{+1}$, $M^{+2}$, $M^{+3}$, $M^{+4}$, a pentose unit, a hexose unit, $-OR_{19}$, or combinations thereof which can also contain oxygen, nitrogen, sulfur or phosphorous;

wherein M is defined the same as previously;

wherein $n_{13}$, $n_{14}$ and $n_{15}$ are independently integers of about 0–500,000 with $n_{13}+n_{14}+n_{15} \geq 3$; and wherein $n_{19}$, $n_{20}$ and $n_{21}$ are independently integers of about of 0–500,000 with $n_{19}+n_{20}+n_{21} \geq 3$; and wherein the other appropriate conditions of Class I apply to Class VII polymer units.

As shown above the unconnected bonds of the $n_{21}$ type polymer unit can be connected to another similar polymer unit or each bond can be independently connected to another type of radical or polymer unit.

Class VIII: urethane or urea polymer units can be defined as:

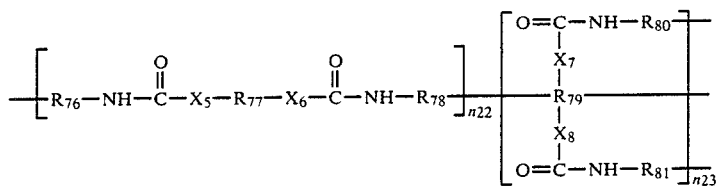

wherein $R_{76}$, $R_{77}$, $R_{78}$, $R_{79}$, $R_{80}$ and $R_{81}$ are independently defined the same as $R_3$;

wherein $X_5$, $X_6$, $X_7$ and $X_8$ are independently —O—, =$NR_{19}$, =$PR_{19}$, or —S—;

wherein $n_{22}$ and $n_{23}$ are independently integers of about 0–500,000 with $n_{22} + n_{23} \geq 3$; and wherein the other appropriate conditions of Classes I and VII apply to the polymer units of Class VIII.

The hydrogen attached to nitrogen atoms above can be reacted with another radical such as a ketone, isocyanate, acid halide, epoxide, and the like to further branch or crosslink the branched polymer.

Examples of polymer units within Class I are:

A.

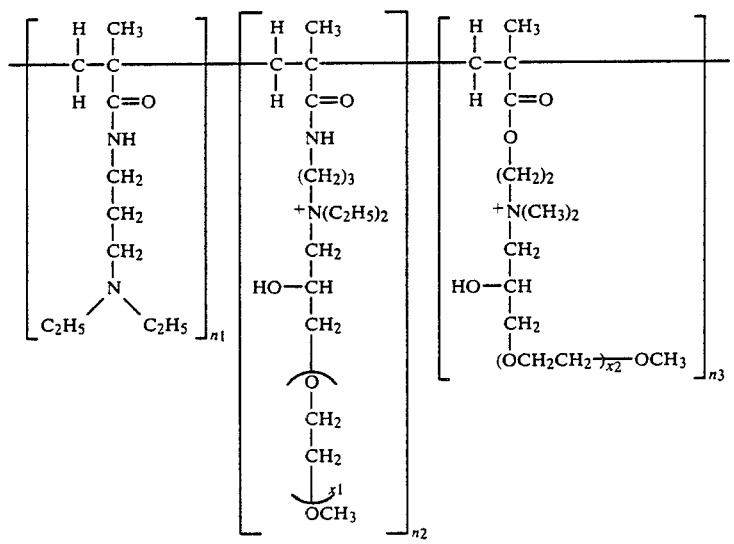

with
$R_1$, $R_2$, $R_7$, $R_8$, $R_{13}$, $R_{14}$ and $R_{16}$ shown as hydrogen;
$R_4$, $R_{10}$ and $R_{16}$ are shown as —$CH_3$;
$R_3$, $R_6$, $R_9$, $R_{12}$, $R_{15}$ and $R_{18}$ being non-existent;
$R_5$ being non-existent;
$R_{11}$ and $R_{17}$ shown as carbonyl

$G_1$ being

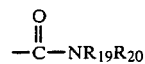

with:
$R_{19}$ being hydrogen; $R_{20}$ being $-(CH_2)_3N(C_2H_5)_2$;
$G_2$ being —$NR_{19}R_{20}R_{21}$ with:
$R_{19}$ being non-existent; $R_{20}$ being hydrogen;
$R_{21}$ being $-(CH_2)_3N^+(C_2H_5)_2CH_2CH(OH)CH_2-(OCH_2CH_2)_{x1}OCH_3$ where $x_1 = 20-700$; and
$G_3$ being —$OR_{23}$ with;
$R_{23}$ being $-(CH_2)_2^+N(CH_3)_2CH_2CH(OH)CH_2(OCH_2CH_2)_{x2}OCH_3$ where $x_2 \cong 20-700$ and $n_1 \cong 10-5{,}000$; $n_2 \cong 0-20$ and $n_3 \cong 0-20$, but $n_2$ and $n_3$ cannot both be zero.

B.

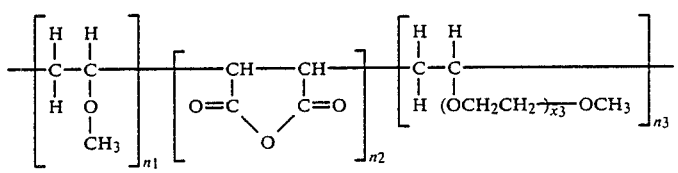

with
$R_3$, $R_5$, $R_6$, $R_9$, $R_{11}$, $R_{12}$, $R_{15}$, $R_{17}$ and $R_{18}$ being non-existent;
$R_1$, $R_2$, $R_4$, $R_7$, $R_{10}$, $R_{13}$, $R_{14}$ and $R_{16}$ being hydrogen;
$G_1$ being —$OCH_3$;
$G_2$ being

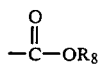

with $R_8$ being carbonyl

$G_3$ being $-(OCH_2CH_2)_{x3}OCH_3$ with $x_3 \cong 20\text{--}700$; and

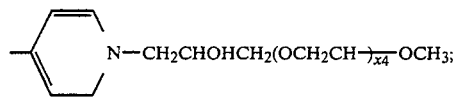

$n_1$, $n_2$, $n_3 \cong 0\text{--}500$ with $n_1+n_2+n_3 \cong 10\text{--}600$, but $n_3$ is not zero;

$x_4 \cong 20\text{--}700$.

Examples of polymer units of Class II are:

A.

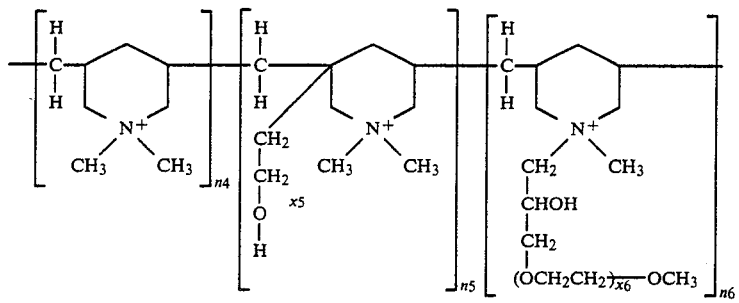

$n_1 \cong 10\text{--}1,000$; $n_2 \cong 10\text{--}1,000$; and $n_3 \cong 2\text{--}1,000$.

C.

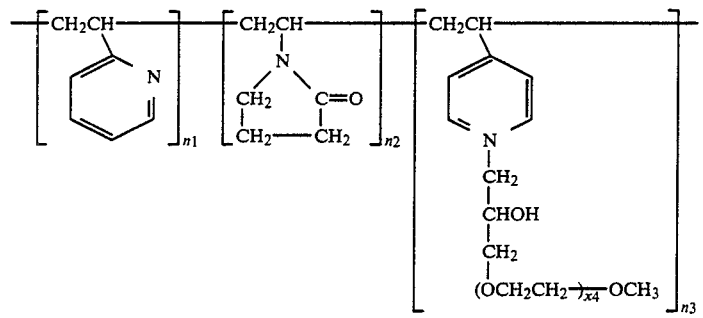

with $R_1$, $R_2$, $R_4$, $R_7$, $R_8$, $R_{10}$, $R_{13}$, $R_{14}$ and $R_{16}$ shown as hydrogen;

$R_3$, $R_6$, $R_9$, $R_{12}$, $R_{15}$, $R_{18}$, $G_1$, $R_{11}$ and $R_3$ being non-existent;

$R_5$ being

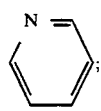

$G_2$ being

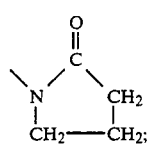

$R_{17}$ being wherein $R_{25}$, $R_{26}$, $R_{29}$, $R_{31}$ and $R_{32}$ are hydrogen;

$R_{27}$ being

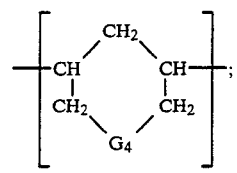

$R_{30}$ being

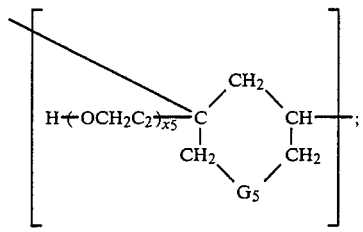

$R_{33}$ being

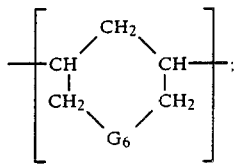

with $G_4$ and $G_5$ being

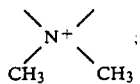

$G_6$ being

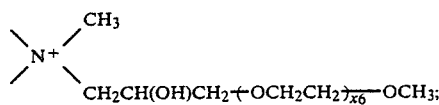

with $x_5$ and $x_6 \cong 0\text{-}3{,}000$;
$n_4 \cong 10\text{-}5{,}000$; $n_5$ and $n_6 \cong 0\text{-}2{,}500$, but $n_5$ and $n_6$ are not both zero; and $n_4 + n_5 + n_6 \cong 10\text{-}10{,}000$.

Examples of polymer units within Class III are:

A.

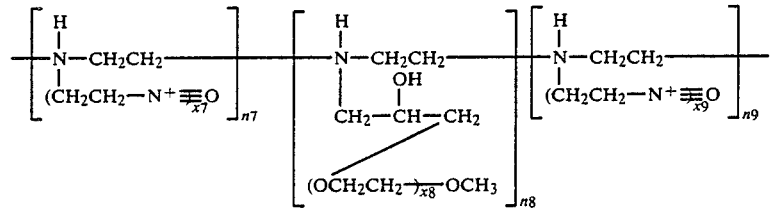

wherein
$R_{34}$, $R_{38}$ and $R_{42}$ are non-existent;
$R_{35}$, $R_{39}$ and $R_{43}$ are hydrogen;
$R_{37}$, $R_{41}$ and $R_{45}$ are —CH$_2$CH$_2$— (ethylene;
$R_{36}$ is $+$CH$_2$CH$_2$—N$^+$$\equiv$O$\xrightarrow{x_7}$ with $x_7 \cong 10\text{-}200$;
$R_{40}$ is —CH$_2$CH(OH)CH$_2$—OCH$_2$CH$_2$$\xrightarrow{x_8}$OCH$_3$ with $x_8 \cong 10\text{-}200$;
$R_{44}$ is $+$CH$_2$CH$_2$—N$^+$$\equiv$O$\xrightarrow{x_9}$ with $x_9 \cong 10\text{-}200$; and
$n_7$, $n_8$ and $n_9$ are each independently $\cong 10\text{-}1500$.

B.

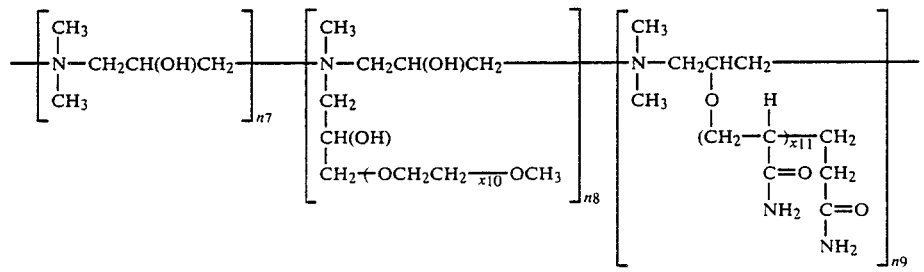

wherein
$R_{34}$, $R_{38}$ and $R_{42}$ are non-existent;
$R_{35}$, $R_{36}$, $R_{39}$, $R_{43}$ and $R_{44}$ are —CH$_3$;
$R_{40}$ is —CH$_2$CH(OH)CH$_2$$+$OCH$_2$CH$_2$$\xrightarrow{x_{10}}$OCH$_3$
with $x_{10} \cong 10\text{-}700$;

$R_{37}$ and $R_{41}$ are —CH$_2$CH(OH)CH$_2$—;
$R_{45}$ is

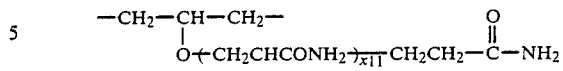

with $x_{11} \cong 20\text{-}20{,}000$; and
$n_7$, $n_8$ and $n_9$ being $\cong 0\text{-}500$ but $n_8$ and $n_9$ are not both zero.

C.

One preferred group of polymeric units or monomeric units include the alkyl group of alkylene imines in which the alkyl or alkylene group contains about 2-4 carbon atoms, e.g., polyethyleneimine (PEI). This type of polymer can be prepared by homopolymerization or copolymerization into either substantially linear or randomly branched polymers. Either type polymer can be grafted with branch chains using the same or a different alkylene imine or alkyl imine monomer or polyalkyleneimine polymers. Other types of branching monomers or polymers can also be attached to the backbone polymer chain such as oxygenated monomers or polymers, e.g. $+$O—R$+$ or $+$N—R$+$ wherein R is alkyl, aryl, alkenyl, cycloalkyl or combinations thereof with each hydrocarbon radical having 1-10 carbon atoms arranged in a structure, combination or ratio to produce the desired hydrophilic-hydrophobic properties. The randomly branched polyalkylimine can be used as a branched polymer as is or it may be further branched or substituted. For these and most preferred polymers and applications the degree of branching should be in the range of about 1-99%, preferably 10-35%, or one to 99 of each 100 potential branching sites shoud have a branch chain attached. For the polyalkylimine this would also mean that the nitrogen to which each branch was attached would be quaternized or protonated, shown as follows for PEI:

with $x_{12} \cong 20–700$;
$R_{51}$ is

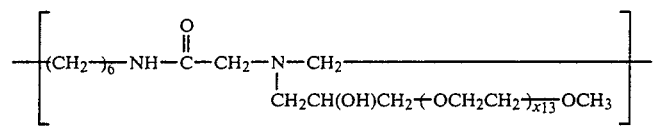

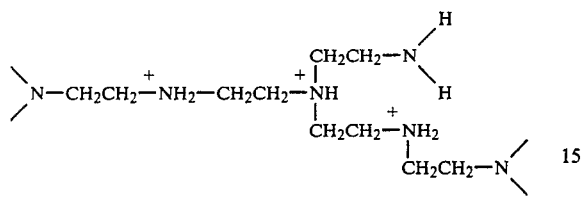

with $x_{13} \cong 0–700$;
$R_{54}$ is

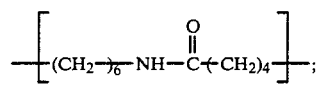

Preferred molecular weight ranges for this class of polymer are about 800–50,000,000 and preferably about 1,000–1,000,000 for WOR control, viscosifiers and mobility control of aqueous fluids.

$n_{10}$ and $n_{11} \cong 0–1500$; $n_{12} \cong 10–3000$, but $n_{10}$ and $n_{11}$ are not both zero.

B.

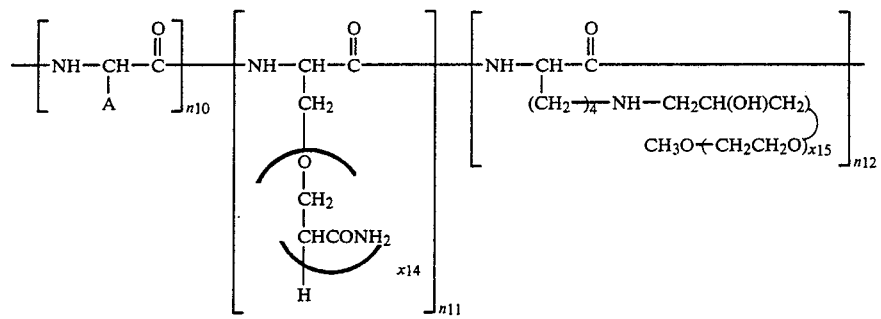

wherein
$R_{46}$, $R_{49}$ and $R_{52}$ are hydrogen;
$R_{47}$, $R_{50}$ and $R_{53}$ are non-existent;

Examples of polymer units within Class IV are:

A.

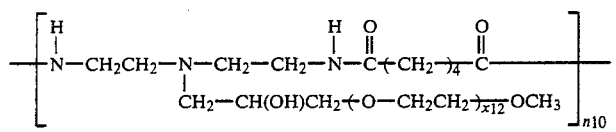

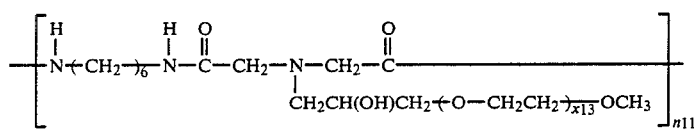

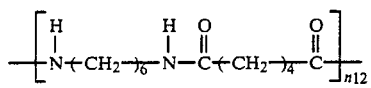

wherein
$R_{47}$, $R_{50}$ and $R_{53}$ are non-existent;
$R_{46}$, $R_{49}$ and $R_{52}$ are hydrogen;
$R_{48}$ is

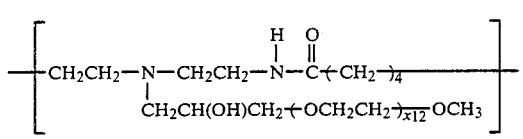

$R_{48}$ is

where A is any of the alpha substituents present in naturally occurring amino acids which comprise the polymeric polyamides generally known as proteins. A detailed discussion of the chemical nature of the alpha substituents and the structures of the polymeric proteins can be found in a biochemistry text.

$R_{51}$ is $CH_2-O+CH_2CHCONH_2)_{\overline{x_{14}}}H$ with $x_{14} \cong 10-50,000$;

$R_{54}$ is $+CH_2+_4NH-CH_2CH(OH)CH_2+OCH_2CH_2)_{\overline{x_{15}}}OCH_3$ with $x_{15} \cong 10-50,000$; and $n_{10} \cong 10-3000$; $n_{11}$ and $n_{12}$ are $\cong 0-1500$ but $n_{11}$ and $n_{12}$ are not both concurrently zero.

Examples of polymer units within Class V are:

A.

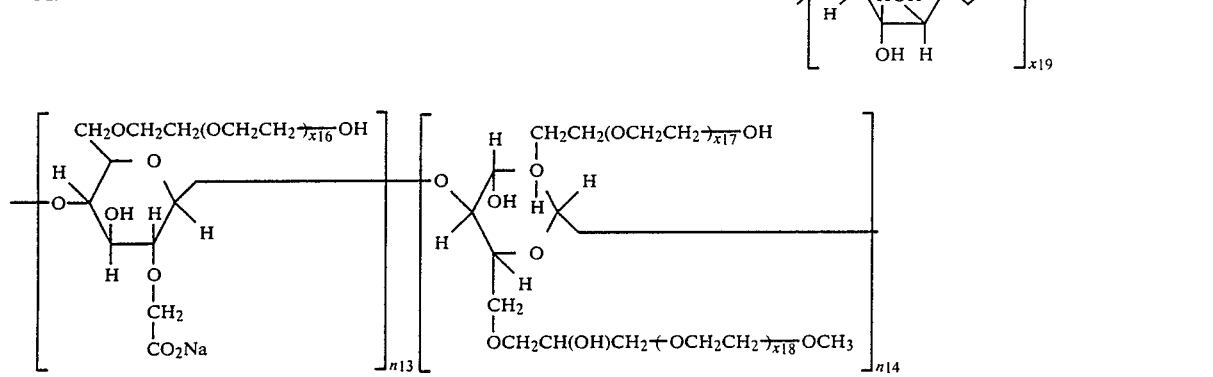

wherein $R_{56}$ and $R_{59}$ are hydrogen;

$n_{15}$ is O or non-existent;

$R_{55}$ is $-CH_2CH_2(OCH_2CH_2)_{\overline{x_{16}}}OH$ and $R_{60}$ $-CH_2CH_2(OCH_2CH_2)_{\overline{x_{17}}}OH$ with $x_{16}$ and $x_{17}$ being independently 0-100;

$R_{57}$ is $-CH_2CO_2Na$;

$R_{58}$ is $+CH_2CH(OH)CH_2-OCH_2CH_2)_{\overline{x_{18}}}OCH_3$ with $x_{18} \cong 10-700$; and $n_{13} \cong 5-5000$ and $n_{14} \cong 1-1000$.

B.

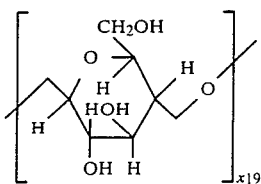

$R_{56}$, $R_{58}$, $R_{59}$, $R_{61}$ and $R_{62}$ are $-H$;

$R_{55}$ is a poly(substituted hexose unit) where $x_{19}$ is about 0-1000;

$R_{57}$ is $-CH_2CH(OH)CH_2+OCH_2CH_2)_{\overline{x_{20}}}OCH_3$ with $x_{20} \cong 10-700$;

$R_{60}$ and $R_{63}$ are $+CH_2CHCONH_2)_{\overline{x_{21}}}$ and $\overline{x_{22}}H$ with $x_{21}$ and $x_{22} \cong 0-5000$; and $n_{13}+n_{14}+n_{15} \geq 3$.

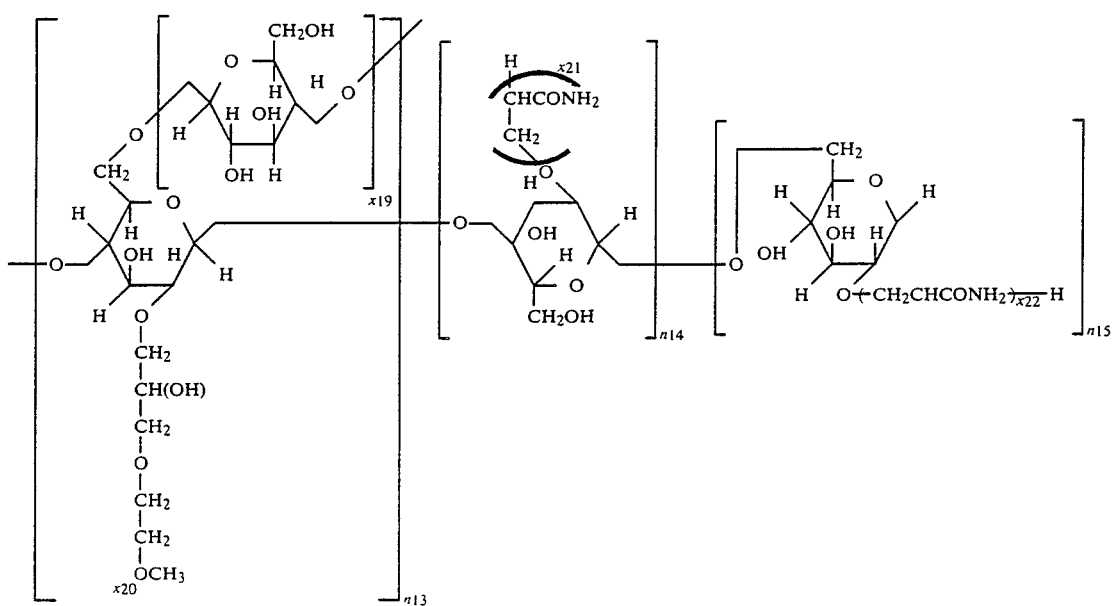

Examples of polymer units within Class VI are:

A.

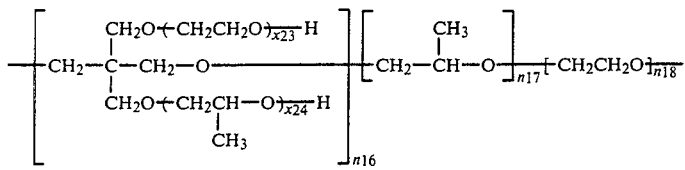

wherein
$R_{65}$, $R_{66}$, $R_{69}$, $R_{71}$ and $R_{72}$ are hydrogen;
$R_{67}$ and $R_{70}$ are —$CH_2$—; $R_{68}$ is —$CH_3$;
$R_{64}$ is

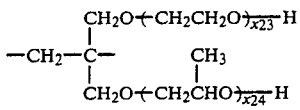

with $x_{23}$ and $x_{24}$ being about 0–3000, but $x_{23}$ and $x_{24}$ are not both zero;
$X_B$, $X_C$ and $X_D$ are —O—; and
$n_{16} \cong 1–5000$; $n_{17} \cong 0–5000$; and $n_{18} \cong 0–5000$;

B.

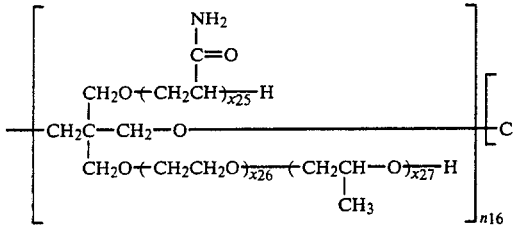

where
$R_{65}$, $R_{66}$, $R_{69}$, $R_{71}$ and $R_{72}$ are hydrogen;
$R_{67}$ and $R_{70}$ are methylene —($CH_2$)—; $R_{68}$ is —$CH_3$;
$R_{64}$ is

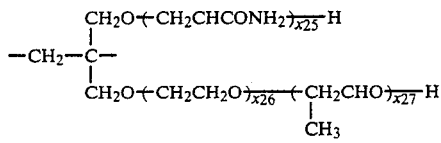

with $x_{25} \cong 0–5000$ and and $x_{26}$ and $x_{27} \cong 0–3000$, but $x_{25}$, $x_{26}$ and $x_{27}$ are not all zero;
$X_B$, $X_C$ and $X_D$ are —O—; and
$n_{16} \cong 1–5000$; $n_{17}$ and $n_{18} \cong 0–5000$.

One preferred class of polymer units from one or more of the above classes are those in which the branch chain polymers contain polymer units such as

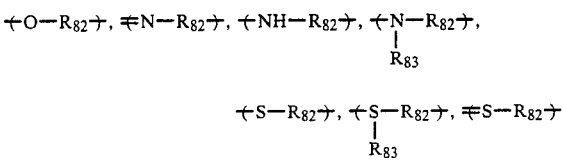

and combinations thereof wherein $R_{82}$ is independently in each position defined the same as $R_3$; and wherein $R_{83}$ is independently in each position defined the same as $R_1$. Within this class a preferred group of polymers are those in which the $R_{82}$ groups are predominantly $C_2$–$C_4$ alkylidene radicals such as ethylene, propylene and/or butylene. These branch chains should preferably have molecular weights up to about 50,000 such as about 800–30,000. These branch chains can contain an average of about 2–25,000 or even up to 50,000 polymer units. The branch chains of any polymer can be substantially uniform or mixtures of different chain lengths and/or configurations can be used. Certain polyethyleneimine polymers as described herein can be used for clay stabilization or WOR alteration. For other uses these polymers, especially the lower molecular weights and ranges, should have additional branching or cross-linking. Certain other preferred polymers of these classes are useful in cements, aqueous fluids having a pH of less than about 10 and especially in acidic media having a pH of less than about 6.5 or even 3.0.

These branch chains can be attached to various types of backbone polymers. The backbone chain and branch chain can both contain substantially the same type of polymer units or combinations of polymer units. The branched polymer can have substantially different backbone polymer chain and branch chain polymer units with each having substantially different properties such as the hydrophilic-hydrophobic nature, ionic character or solubility in various fluids. For example, the backbone chain can be highly ionic (e.g., either anionic, cationic, amphoteric or a mixture thereof) with the branch chain being essentially nonionic, yet being highly hydrophilic or solvatable in the presence of aqueous fluid. The ionic groups can be in linear backbone chains, in pendent groups of the backbone chain or both. Another preferred polymer can have the backbone chain more hydrophilic and the ionic groups can be in the branch chains. Yet another preferred polymer can have portions of backbone chains and/or branch chains with the above descriptions. The overall branched polymer properties can make it highly water soluble or only slightly water soluble. It might also be soluble in other fluids such as organic fluids or substituted organic fluids including polar solvent such as alcohols ($C_1$–$C_{18}$), organic acids, sulfonated hydrocarbons, oxygenated hydrocarbons or polyol hydrocarbons.

Another preferred class of polymers from the above classes are those polymers which contain more than one type of polymer unit. These polymers can be those defined by a single formula of the above eight classes or by combining two of more formulas from different classes. This class of polymers includes those with at least one type of polymer unit derived from alkylacrylate, arylacrylate, alkyl acrylamide, aryl acrylamide, alkyl aziridene, aryl aziridene, alkoxide, alkyl epoxide, the reaction product of ammonia or alkyl amine reacted with an alkyl dihalide, an alkyldiepoxide, or combination thereof, or combinations of these polymer units. In these units the hydrocarbon radicals can contain 1–10 carbon atoms. In certain units, such as the acrylate and acrylamide, when the hydrocarbon radical has zero carbon atoms it is non-existent. In other units there may be more than one hydrocarbon substituent and the substituent may be in one of various positions in each unit. A particularly preferred and surprisingly stable and effective polymer for gelling aqueous fluid, especially acidic aqueous fluid, as well as for reducing WOR, are polymers and copolymers containing substantial amounts of methacrylate units in the backbone chain. These polymers with alkylidene oxide branches are essentially permanent and stable at high temperatures, even in high pressure steam. These polymers are also effective for controlling fluid loss from aqueous fluids such as cements, treating fluids, fracturing fluids and acidizing fluids; for stabilizing clays in the presence of aqueous fluids; and for reducing friction loss when pumping various fluids. "Stability" as used herein refers to use of the polymers for increasing viscosity of aqeuous fluids, especially for gelling acids for fracturing and/or acidizing, and means the polymer fluid mixture should maintain the major portion of its viscosity for two hours at about 140° F. in 5% hydrochloric acid with no significant loss in viscosity or formation of precipitate.

Additional examples of polymer units within one or more of the above classes are:

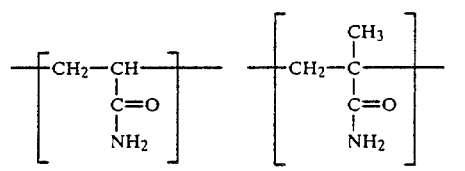

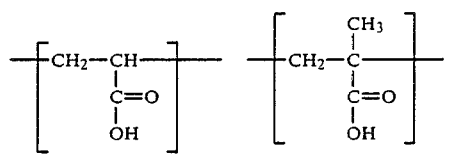

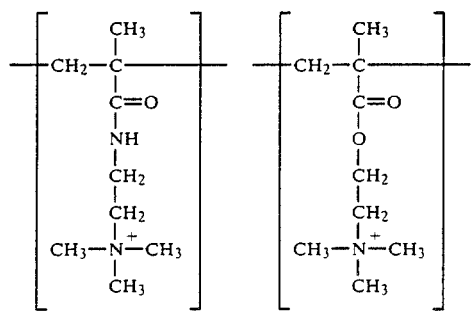

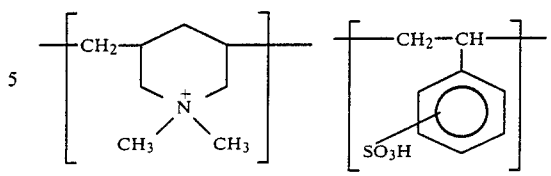

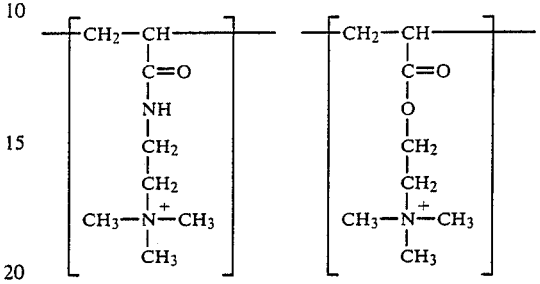

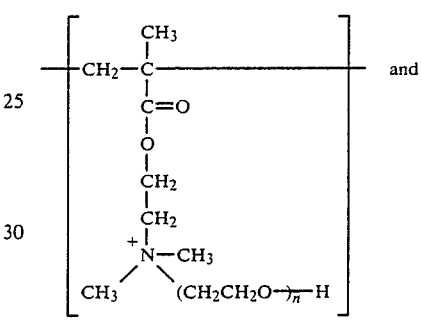

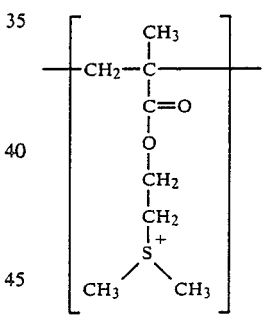

Some of these formula can be written in more general form as:

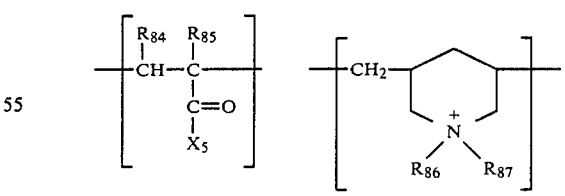

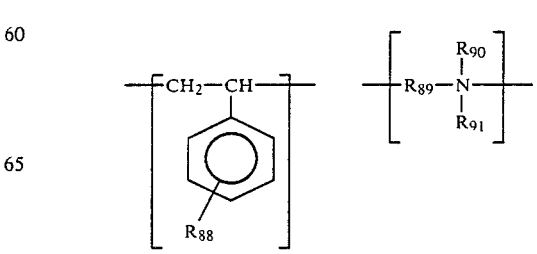

or $$\left[\begin{array}{cc} R_{92} & R_{94} \\ -C- & -C- \\ R_{93} & C=O \\ & X_6-R_{95} \\ & R_{96} \\ & R_{97}-X_7-R_{98} \\ & R_{99} \end{array}\right]$$

wherein $R_{84}$, $R_{85}$, $R_{86}$, $R_{87}$, $R_{88}$, $R_{90}$, $R_{91}$, $R_{92}$, $R_{93}$, $R_{94}$ being independently defined as $R_1$ herein;

wherein $R_{89}$, $R_{95}$, $R_{96}$, $R_{97}$, $R_{98}$ and $R_{99}$ are independently defined as $R_3$ herein; and wherein $X_5$, $X_6$ and $X_7$ are independently defined as $G_1$ herein.

Several preferred polymer units include the alkyl acrylates and acrylamides and substituted alkyl acrylates and acrylamides and can be defined by the more general formula:

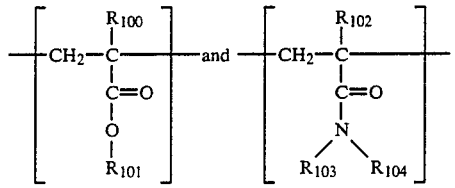

wherein $R_{100}$ and $R_{102}$ can be hydrogen, alkyl, aryl, hetero groups or combinations thereof with each hydrocarbon radical containing about 1 to 6 carbon atoms;

$R_{101}$, $R_{103}$ and $R_{104}$ can be hydrogen, iso or normal alkyl, aryl, hetero groups or combinations thereof with each hydrogen radical being selected independently and containing about 1 to 6 carbon atoms.

Preferred branch chains or R groups for these polymer units include $-(R_{105}N)_n-$ or $-(R_{106}O)_n-$, with $R_{105}$ and $R_{106}$ being an alkylene unit having about 1-10 carbon atoms per each hydrocarbon radical and n is an integer up to about 50,000 and preferably up to about 2,000.

One particularly preferred class of polymers for altering aqueous fluid properties, such as reducing WOR, gelling aqueous fluids, fluid loss control, and enhancing oil production, are those containing alkyl acrylate backbone units and ethylene oxide branches such as those defined by the formula:

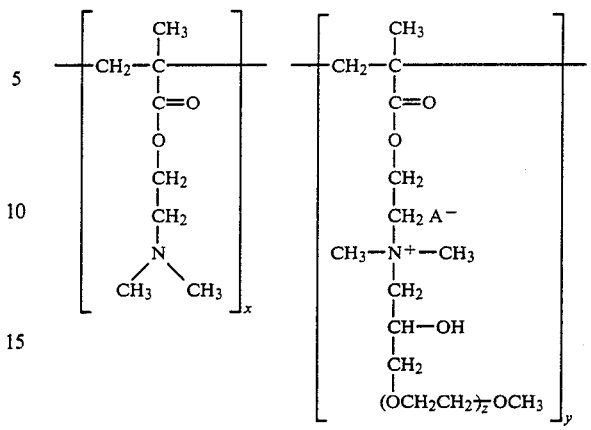

with x being about 10 to 60,000, preferably 10 to 15,000; y being about 1 to 90,000, preferably 1 to 5,000; and z being about 2 to 25,000, preferably 2 to 10,000; and $A^-$ is an anion associated with the quaternary nitrogen.

These preferred polymer units can also have other substituents, especially on the carbon and nitrogen atoms. The polyethylene oxide chain, $-(OCH_2CH_2)_z-$, can also be capped or terminated by hydrogen, hydroxyl, $C_1-C_6$ oxyalkyl, $C_6-C_8$ oxyaryl, oxy(2 hydroxy-3-chloropropane) or oxy(-2,3-oxopropane) as well as the methoxy group shown.

One particularly preferred class of polymers for altering aqueous fluid properties, such as reducing WOR, gelling aqueous fluids and enhancing oil production, are those containing 2-hydroxypropyl N,N-dialkyl-amine backbone units and acrylamide and/or epichlorohydrin reacted polyalkoxide branches such as those defined by the formula:

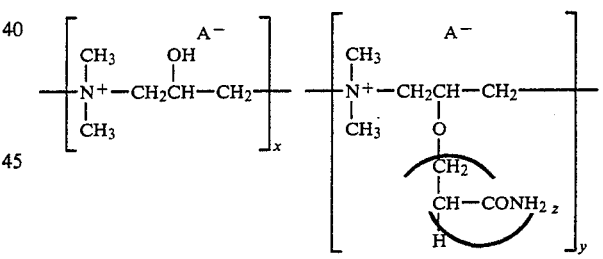

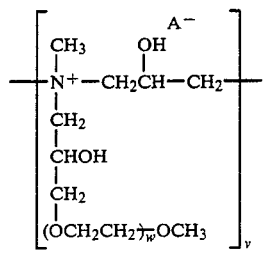

with
v being about 0-60,000 and preferably 0-2,000;
w being about 2-10,000 and preferably 2-1,000;
x being about 10-60,000 and preferably 10-10,000;
y being about 0-60,000 and preferably 0-2,000;
z being about 3-100,000 and preferably 3-30,000; and
$A^-$ is an anion associated with the quaternary nitrogen.

These preferred polymer units can also have other substituents especially on the carbon and nitrogen atoms.

The polyalkyloxide chain $(OR)_w$ can also be capped or terminated by hydrogen, hydroxyl, $C_1-C_6$ alkyl, $C_6-C_{10}$ aryl, oxy(2-hydroxy-3-chloropropane), or oxy(2,3-oxopropane) as well as the methoxy group shown.

One particularly preferred class of polymers for altering aqueous fluid properties, such as reducing WOR, gelling aqueous fluids and enhancing oil production, are those containing methylene piperidinium backbone units and epichlorohydrin reacted polyalkoxide branches such as those defined by the formula:

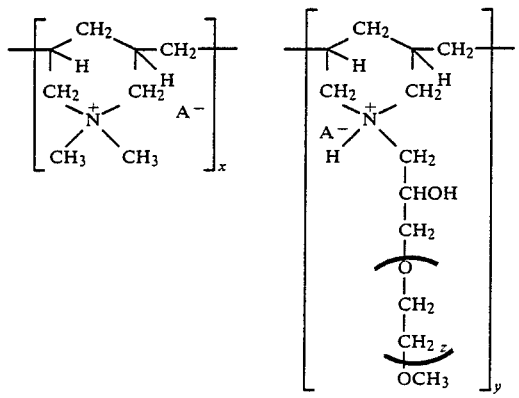

with
x being about 10–50,000 and preferably 10–3,000;
y being about 1–10,000 and preferably 2–1,000; and
z being about 2–10,000 and preferably 2–1,000.
These preferred polymer units can also have other substituents especially on the carbon and nitrogen atoms.

The polyalkyloxide chain $(OR)_z$ can also be capped or terminated by hydrogen, hydroxyl, $C_1-C_6$ alkyl, $C_6-C_{10}$ aryl, oxy(2-hydroxy-3-chloropropane), or oxy(2,3-oxopropane) as well as the methoxy group shown.

One particularly preferred class of polymers for altering aqueous fluid properties, such as reducing WOR, gelling aqueous fluids and enhancing oil production, are those containing alkyl ether and butane dicarboxylate backbone units and epichlorohydrin reacted polyalkoxide and/or polyalkoxide such as those defined by the formula:

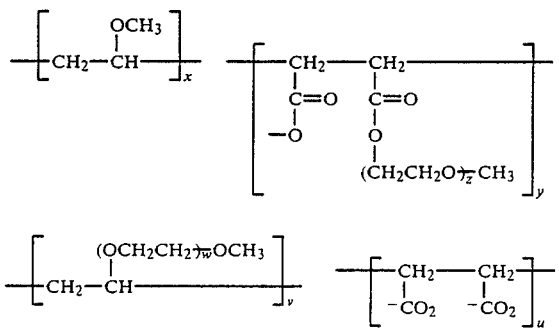

with
u being about 10–60,000 and preferably 10–10,000;
v being 0–10,000 and preferably 0–2,000;
w being 2–10,000 and preferably 2–1,000;
x being about 10–60,000 and preferably 10–10,000;
y being 0–10,000 and preferably 0–2,000; and
z being about 2–10,000 and preferably 2–1,000.

These preferred polymer units can also have other substituents especially on the carbon and nitrogen atoms.

The polyalkyloxide chain $(OR)_w$ can also be capped or terminated by hydrogen, hydroxyl, $C_1-C_{16}$ alkyl, $C_6-C_{10}$ aryl, oxy(2-hydroxy-3-chloropropane), or oxy(2,3-oxopropane) as well as the methoxy group shown.

PROCEDURE A

Preparation of a Branched Polymer Containing Polyacrylamide Branches

1. To a three-neck 250 ml flask equipped with a condenser, stirring device, gas inlet tube and temperature probe, is added 50 cc of distilled water and 30 g of a commercially available polymer prepared from epichlorohydrin and dimethyl amine.

2. The flask is purged with nitrogen gas while 0.4 g isopropyl alcohol and 20 g of acrylamide monomer (as a 40% aqueous solution) is added. The reaction contents are heated to 64° C.

3. Introduce 0.27 g of an azobisisobutyronitrile radical polymerization initiator and maintain temperature at 85° C. for 3 hours. The product consists of a pale yellow to amber fluid with 2000 to 8000 cP viscosity on a #3 Brookfield spindle at 12 rpm, 25° C.

PROCEDURE B Preparation of a Backbone Polymer and Subsequent Grafting of Branches to the Polymer 1. To a three-neck 500 ml flask equipped with a condenser, stirring device, gas inlet tube and temperature probe, heating mantle and addition funnel is added 160 g of dimethyldiallylamine monomer (as a 40% aqueous solution) and 40 g diallylamine monomer. The pH of the reaction mixture is adjusted to approximately 4.0.

2. The flash is purged with nitrogen gas while the contents are heated to 70° C.

3. 10 g of ammonium persulfate catalyst is dissolved in 100 g of water and placed in the addition funnel. The catalyst is added in 5 equal portions every 30 minutes while the temperature is maintained at 70° C. The reaction mixture is then maintained at 80° C. for an additional 2 hours. The reaction mixture is cooled and the nitrogen purge is discontinued. The reaction product is a viscous yellow fluid.

4. A quantity of product from Step 3 above is removed which represents 1.76 g of active copoly(dimethyldiallyldiallyl)ammonium chloride. To this is added 2.6 g of active MPEO-epichlorohydrin adduct product prepared as described in Procedure C herein. Dilute this mixture with water to a concentration of about 4% active polymer.

5. Adjust the pH to about 9.5 with 50% sodium hydroxide solution. Salt can be added to reduce viscosity.

6. Place the polymer mixture in a sealed container and in a water bath at 60° C. for two hours to permit the reaction to proceed. Stirring can be used to keep it pumpable but stirring may affect time to produce a given viscosity product.

7. Dilute the branched or grafted copolymer to a concentration of about 2% with water or salt solutions and shear the fluid with a mixer (e.g. high speed Hamilton Beach Blender) to a constant viscosity.

8. Read the viscosity if desired and use the resulting product for testing effectiveness as a WOR chemical or as an acid gelling agent as described in Procedures E through O.

PROCEDURE C

Preparation of A Branching Agent Or A Polymeric Branch Chain

1. A methoxypolyethylene glycol or oxide (referred to herein as MPEG or MPEO), such as CARBOWAX-®MPEG 5000, 0.04 moles or 200 gm, is added to a three-neck 500 milliliter flask equipped with a condenser, stirring device, gas inlet tube and temperature probe.

2. The flask is purged with nitrogen gas while the glycol is melted using a water bath at 65°–75° C.

3. The water bath is removed and 0.12 moles (11.1 gm) epichlorohydrin is added and mixed by stirring for 15 minutes.

4. Boron trifluoride etherate is added and the temperature is kept between 65°–75° C. with cooling and heating when necessary.

5. The MPEO-epichlorohydrin reaction product (i.e., MPEG or MPEO-adduct) is stirred for one hour.

6. Excess epichlorohydrin is removed with a rotary evaporator and the branching adduct or branching agent is diluted with an equal quantity of water.

PROCEDURE D

Preparation of A Branched Copolymer From A Commercially Available Copoly(methylvinylether/maleic anhydride) Backbone 1. To a 250 ml three-necked flask equipped with a condenser, stirring device, heating mantle, and temperature probe, is added 90 cc of water, 7.3 g of a high molecular weight mixed oxide polyglycol, and 1.4 g of nonylphenol surfactant. The reaction contents are heated to 50° C.

2. To the stirred, heated reaction flask contents is added 1.3 g of commercially available methylvinylether/maleic anhydride polymer and the reaction heated for 4 hours. The result is an off-white fluid having 5800 cP viscosity at 25° C. measured with a number 3 Brookfield spindle, at 12 rpm.

PROCEDURE E

Preparation Of A Branched Copolymer From A Commercially Available Polydimethylaminoethylmethacrylate (i.e. PDMAEM)

1. Add the amount designated in Table 12 of the cationic backbone polymer into a container, add the designated quantity of water and stir until the polymer is dissolved. Add the designated amount of branch chain adduct polymer and stir for three minutes.

2. Adjust the pH to about 9.5 with 50% sodium hydroxide solution. Salt can be added to reduce viscosity.

3. Place the sealed container in a water bath at 60° C. for two hours to permit the reaction to proceed. Stirring can be used to keep it pumpable but stirring may affect time to produce a given molecular weight or viscosity.

4. Dilute the branched or grafted copolymer fluid with 75 milliliters of water and shear the fluid with a mixer (e.g. high speed Hamilton-Beach blender) to a constant viscosity.

5. Read the viscosity using a Model 35 Fann Viscometer at 300 RPM, standard bob and sleeve in centipoises (cp or cps).

6. For testing the polymer effectiveness for gelling aqueous acid, add the required amount of concentrated acid (see Tables 12, 13, 14, 15 and 16) to the concentrated aqueous polymer mixture. Then dilute, if necessary, to the desired acid and polymer concentration with stirring. Measure the mixture viscosity on the Fann Viscometer as before (e.g., 1.5% active polymer solids concentration in 5% hydrochloric fluid).

PROCEDURE F

Preparation of a Modified-Branched Polymer (PEI)

1. Add the desired amount of a commercially available branched polyethyleneimine polymer (molecular weight about 40,000 to 100,000) to water to make a 6% active polymer concentration of PEI.

2. Add an extending or branching agent as described in Table 19 (6% concentration) and stir while heating (pH>9-10) at 140° F. until gelation occurs.

3. Dilute the viscous gel with hydrochloric acid to the desired acid concentration.

4. Measure the apparent viscosity on a Model 35A FANN Viscometer, No. 1 spring, standard bob and sleeve.

PROCEDURE G

Evaluation Of Effectiveness Of Branched Polymer For Reduction Of Aqueous Fluid Flow 1. Place a small quantity of glass wool into the bottom of a 100 milliliter (ml) buret.

2. Pour 50 ml of deionized water into the closed buret.

3. Place 5.0 grams (gm) of 8–12 mesh sand into the bottom of the buret followed by 25.0 grams of 20–40 mesh sand. Place 5.0 grams of 8–12 mesh sand on top of the 20–40 mesh sand.

4. Tap the buret gently to obtain a 20–40 mesh sand pack length of 8–9 centimeters (cm).

5. Drain off excess deionized water to the top of the 8–12 mesh pack and note the level of the meniscus in the buret and record as zero level.

6. Place 25 ml of deionized water into the buret (use syringe or pipette) and record the time necessary for it to pass through the pack and reach the zero level. This is Initial Time.

7. Prepare a (1000 parts per million [ppm] polymer solids) branched polymer solution in deionized water and adjust to a pH below about 5.0 with an acid such as hydrochloric acid.

8. Introduce 100 cubic centimeters (cc) of the branched polymer treating solution and flow it through the buret to the zero level.

9. Follow the treatment with 75 ml of deionized water.

10 Repeat step 6; this is the Final Time.

11. Divide Initial Time by Final Time and multiply by 100 to get % of initial flow rate.

PROCEDURE H

Preparation of A Branched Polymer In Situ

A portion of backbone polymer such as polyethyleneimine [MW~40,000–100,000 gm/mole (g/m)] in an aqueous fluid is combined with an equal active weight of MPEO-eipchlorohydrin adduct (about 5000 g/m) prepared as described in Procedure C and diluted with water to about a 5000 ppm total polymer concentration. The pH is adjusted to above about 7 to 8. This solution is then either injected into the test core or the formation to be treated.

If treating a test core, Procedure I should be used; if treating a formation, Procedure N should be used, except that after the treatment stage has been completed, the system must be allowed to remain static for a period of time determined by the temperature, e.g. 24 hours at 160° F. After this curing time has been accomplished, the test media is returned to production and changes in flow rates are noted.

PROCEDURE I

Method of Evaluating Effectiveness Of Branched Polymer For Reduction Of Aqueous Fluid Flow Through A Clayey Sand Pack A dry blend of sand was prepared by mixing 88 parts of about 70-170 mesh sand with 10 parts of fine silica flour (smaller particle size than about 200 mesh) and two parts of smectite clay. This blend (100 gm) was packed into a TEFLON ® polymer lined test chamber (2.38 cm I.D.) or a Hassler sleeve test chamber (2.38 cm I.D.). Approximately 25 cc of 6.7% brine solution was produced through the sand pack and the test chamber was either shut in overnight or for two hours at 80° C. to insure complete hydration of clays. A brine solution (6.7% sodium chloride) was produced through the sand pack until equilibrium conditions were achieved, i.e., no change in differential pressure ($\Delta P_i$) and flow rate ($Q_i$). A solution of the chemical to be tested was then injected through the sand pack in the opposite direction. Then production was continued until equilibrium conditions again existed and the flow rate ($Q_f$) and differential pressure ($\Delta P_f$) noted. The percent retention (%$K_i$) of the initial permeability was then obtained by the following expression:

$$\% K_i = \frac{(Q_f)(\Delta P_i)}{(Q_i)(\Delta P_f)} \times 100 \text{ or } \frac{K_f \times 100}{K_i}$$

where: $Q_i$=initial flow rate; $Q_f$=final flow rate; $\Delta P_i$=initial pressure drop across the chamber and $\Delta P_f$=final pressure drop or differential pressure. % reduction=100−%$K_i$.

PROCEDURE J

Determination Of Relative Oil Permeability In A Sand Pack

After the determination of the percent retention of initial brine permeability (%$K_i$) by Procedure I, kerosene (2.7 cp) was produced through the sand pack. The flow rate and differential pressure were noted. The percent of the oil permeability compared to the initial brine permeability was calculated by:

$$\% K_{oiB} = \frac{(Q_{of})(\Delta P_{Bi})(2.7)}{(Q_{Bi})(\Delta P_{of})} \times 100$$

PROCEDURE K

Determination Of Branched Polymer Effectiveness For Reduction Of Aqueous Fluid Flow Through A Core A Berea sandstone core or limestone core (2.38 cm O.D.×10 cm) was mounted into a Hassler sleeve test chamber (2.38 cm I.D.). Approximately 25 cc of 6.7% brine solution was produced through the core and the test chamber was either shut in overnight or for 2 hours at 80° C. to insure complete hydration of clays. A brine solution (6.7%) was produced through the core until equilibrium conditions were achieved, i.e., no changes in pressure and flow rate. A solution of the chemical to be tested was then injected through the core in the opposite direction. Then production was continued until equilibrium conditions again existed and the flow rate and differential pressure noted. The percent of the initial permeability was then obtain by the following expression:

$$\% K_i = \frac{(Q_f)(\Delta P_i)}{(Q_i)(\Delta P_f)} \times 100$$

where: $Q_i$=initial flow rate and $Q_f$—final flow rate.

PROCEDURE L

Determination Of Relative Oil Permeability In A Core

After the determination of the percent retention of initial brine permeability (%$K_i$) by Procedure K, kerosene (2.7 cp) was produced through the core. The flow rate and differential pressure was noted. The percent of initial brine permeability to oil was calculated by:

$$\% K_{oiB} = \frac{(Q_{of})(\Delta P_{Bi})(2.7)}{(Q_{Bi})(\Delta P_{of})} \times 100$$

PROCEDURE M

A Typical WOR Procedure

A typical WOR procedure is designed for 40 gallons of polymer mixture per foot of perforations. This is done by diluting a concentrated branched ionic polymer concentrate solution about 10:1-70:1 with water (e.g., formation water, brine or 2% potassium chloride solution), and then adding about 20° Baume hydrochloric acid to adjust the pH to about 3-6. After the tubing is pressure tested and the injection rate established, the branched polymer solution is pumped at about two barrels per minute, followed by water. This procedure is repeated in sequence until all the branched polymer solution is injected into the well. After the last stage is pumped, water is pumped as an overflush.

PROCEDURE N

One recommended procedure uses about 30 pounds of branched ionic polymer in a concentrate solution (solids) per interval foot diluted about 15:1-50:1. The treatment volume depends on the porosity and radial penetration desired in the formation. Table 22 gives recommended volumes.

If the total water producing interval is not known, it is recommended that about a 10-30 foot penetration over the entire producing interval be used to determine treatment volume. If the total water producing interval is known or a good estimate is available, then about a 30-50 foot penetration into this interval is recommended. It may be assumed, for this calculation, that all treatment fluid will enter the water producing zone. For greater radical penetration a more dilute solution can be used.

The mixing water can be any compatible brine solution. Additives (e.g., corrosion inhibitors, bactericides, surfactants, etc.) need to be checked for compatibility.

The polymer should be added with mixing to the carrier fluid. Turning the tank 2-4 times with a reciprocating pump or a turbine or ribbon type blender should provide sufficient mixing. The pH should be adjusted to 3–5 with hydrochloric acid or other acid.

An initial injection rate and injection pressure should be determined using water or other available aqueous fluid. The rate should be as high as feasible while maintaining a pressure which is below fracturing pressure. It may be necessary to decrease the injection rate in order to remain below the maximum allowed pressure. The branched ionic polymer treatment solution should be overdisplaced using an aqueous fluid, gas or a hydrocarbon such as water, nitrogen, or lease oil. The well can be immediately returned to production.

Treatment Sequence

1. Select a candidate well with an available production history.
2. Evaluate proposed carrier fluids such as water, crude oil, etc. and well production information.
3. Mix branched polymer solution.
4. Determine the injection rate and pressure using available fluid.
5. Pump branched polymer treatment solution through tubing, annulus or both, maintaining a pressure below formation fracturing pressure. p 6. Over displace branched ionic polymer solution into the formation using an available fluid such as an aqueous fluid, gas, hydrocarbon or mixture thereof.
7. Put well on production.

PROCEDURE O

Example Or Procedure For Method of Reducing WOR (Water-Gas Ratio)

A dry sand pack (65 cm long × 0.72 cm diameter) was prepared from a blend of 80 parts of 70–270 mesh sand, 15 parts silica flour and 5 parts of smectite. The equilibrium gas (methane) flow-rate through the dry pack was 3900 cc/min at 500 psi differential pressure. After saturating the sand pack with 6.7% NaCl solution, a maximum flow rate of 1020 cc/min methane at 500 psi differential was achieved. This sand pack was then treated with 100 ml of a 1,000 ppm solution of a water soluble, ionic, branched polymer (PDMAEM [800,000 to 1,000,000 MW grafted with polyethylene oxide [5,000 MW] branches 1:1 backbone-branch ratio by weight). The flow to water was reduced more than 90% while the flow to gas was 170% of the initial. Approximately 1,000 l of methane was required to reestablish equalibrium flow conditions.

TABLE 1

Alteration Of Flow and Viscosity Properties By Polyethylenimine Polymers With Branching And Molecular Weight Variation[1]

| Polymer Identity | Molecular Wt. Range | Viscosity, Cps Brookfield @ 25° C. of 5% Aqueous Solution | Active Conc. Of Polymer In Treating Solution, % | Test Temp., °C. | Extended Flow[6] | Reduction Of Water Permeability, % | % $K_{oiB}$[9] |
|---|---|---|---|---|---|---|---|
| PEI 12 (Dow Chemical Co.) | 1,200 | 3.1 | 1.0 | 27 | Yes | 0.0 16.0 | ND[2] |
| PEI 600 (Dow Chemical Co.) | 40,000–60,000 | 28 | 0.5 | 27 | Yes | 75.4 | 84.8 |
| PEI 600 (Dow Chemical Co.) | 40,000–60,000 | 28 | 0.1 | 27 | Yes | 73.5 | 100.5 |
| PEI 1000 (Dow Chemical Co.) | 50,000–100,000 | 1200 | 0.05 | 27 | Yes | 91.6 | 90.0 |
| PEI 1000 (Dow Chemical Co.) | 50,000–100,000 | 1200 | 1.33 | 27 | Yes | 87.7 | 93.0 |
| PEI 1000 (Dow Chemical Co.) | 50,000–100,000 | 1200 | 1.0 | 27 | Yes | 85.6 | 75.7 |
| PEI 1000 (Dow Chemical Co.) | 50,000–100,000 | 1200 | 1.0 | 60 | Yes | 80.5 | 99.2 |
| PEI 1000 (Dow Chemical Co.) | 50,000–100,000 | 1200 | 0.1 | 27 | Yes | 83.6 | 90.0 |
| PEI 1000 (Dow Chemical Co.) | 50,000–100,000 | 1200 | 0.1 | 27 | Yes | 81.2[3] | 93.2[3] |
| PEI 1000 (Dow Chemical Co.) | 50,000–100,000 | 1200 | 0.1 | 82 | Yes | 98[4] | 140[4] |
| Polymin P (BASF) | 50,000–55,000 | 7 | 0.5 | 60 | No | 66[4,7] | ND[2] |
| EPOMIN P-1000 (Japan Catalytic Chemical Co.) | 60,000–80,000 | 9 | 0.1 | 27 | No | 0[4,7] | ND[2] |
| EPOMIN P-1000 (Japan Catalytic Chemical Co.) Polymer grafted with methyoxypolyethyleneoxide branches[8] | | 108,000[5] | 0.05 | 27 | No | 42[4,7] | ND[2] |

[1]All flow tests involved clayey sand packs (88:10:2 parts by weight [pbw] respectively of Oklahoma No. 1 sand, fine silica flour [≈−200 mesh] and bentonite) unless otherwise indicated.
[2]ND — Not Determined.
[3]Test sand consisted of a mixture of 2:10:88 pbw respectively of bentonite, 70–170 U.S. mesh CaCO3 particles, fine silica flour and Oklahoma No. 1 sand (U.S. Mesh 70–170).
[4]Flow tests performed using a Berea core.
[5]Viscosity of a 2.0% aqueous solution.
[6]All tests involved flowing fluids to a stabilized rate; however, extended flow continued beyond this point up to 10,000 pore volumes on same tests.
[7]Core different from those used to test PEI 1000. Difference in core can cause some variation or difference in test results.
[8]Polymer grafted using procedures such as C and E with 1:1 backbone polymer to branch polymer weight ratio.
[9]% $K_{oiB}$ as determined in Procedure J or L.
The data show that high molecular weight branched PEI polymers are effective for altering permeability to aqueous fluids where low molecular weight PEI is not effective and/or long lasting.

TABLE 2

Comparison Of Flow Property Changes In Sands[1] Using Linear Polyacrylamide And Branched Polyethylenimine Polymers

| Polymer Identity | Test Temp., °C. | Active Polymer Concentration In Treating Solution, % | Reduction of Water Permeability, % | % $K_{oiB}$[5] |
|---|---|---|---|---|
| Polyacrylamide[4] (Calgon WC-500) | 24 | 0.05 | 23[2] | ND[3] |
| PEI 1000 (Dow Chemical Co.) | 24 | 0.05 | 94.4 | 104 |
| PEI 1000 (Dow Chemical Co.) | 60 | 0.5 | 98.1 | 123 |
| PEI 1000 (Dow Chemical Co.) | 82 | 0.5 | 70.2 | ND[3] |

[1]Test sand was constituted by 85:15 parts by weight (pbw) respectively of Oklahoma No. 1 sand and fine silica flour.
[2]Linear polyacrylamide gave significant reduction in water permeability but its effectiveness rapidly diminished (see Table 13).
[3]ND — Not Determined.
[4]20% anionic polyacrylamide.
[5]Determined according to Procedure J.
The data show that a branched PEI polymer is effective for reducing permeability to an aqueous fluid and increasing permeability relative to oil when compared to a polyacrylamide polymer.

TABLE 3

The Reduction Of Water Permeabilities After Treatment With PEI-1000 On Various Permeability Sand Packs[1]

| Oklahoma #1 Sand & Fine Silica Flour Parts By Weight | Permeability of Sand (Darcy) | Permeability After Treating (Darcy) | Reduction of Water Permeability, % |
|---|---|---|---|
| 1:0 | 11.9 | 8.80 | 26.0 |
| 9.75:0.25 | 9.60 | 6.60 | 31.0 |
| 9.25:0.75 | 1.04 | .035 | 96.5 |
| 9:1 | .246 | .030 | 87.5 |
| 8:2 | .197 | .003 | 98.5 |
| 7:3 | .090 | .004 | 95.5 |

[1]These tests were performed in Teflon ® polymer sleeve consolidation apparatus at room temperature. Both initial and final permeabilites were obtained from stabilized flow rates. Treatments were 75 cc of .5% PEI-1000 with the pH adjusted to 4.

The above data demonstrates relative effectiveness of a particular polymer as applied in loose sand packs of various permeabilities. The performance of other branched polymeric structures covered by these teachings will vary with polymer and formation characteristics. Polymeric molecules may be varied in molecular weight, degree of polymeric branching, length of polymeric branches, etc. to achieve different effects and magnitudes of effectiveness dependent on the matrix to be treated.

TABLE 4

The Effect Of A Branched Polymer On Altering The Water Permeability Of A Clayey Sand Pack Subjected To Steam Flow

| Procedure Step | Step Description | Pack 1 | Pack 2 | Pack 3 |
|---|---|---|---|---|
| 1 | % of Initial water perm at 70° F. | 100 | 100 | 100 |
| 2 | Treatment volume of a branch polymer (1000 ppm) at 70° F. (cc) | 600 | 800 | 500 |
| 3 | % of initial water perm after treatment at 70° F. | .5 | .8 | .3 |
| 4 | Produced volume of steam at 350° F. (cc) | 700 | 4000 | 2000 |
| 5 | % of initial water perm after subjected to steam flow | .6 | 9.7 | 16.4 |
| 6 | Produced volume of steam at 500° F. (cc) | 2400 | 2400 | 900 |
| 7 | % of initial water perm at 70° F. after subjection to 500° F. steam | 1.1 | 1.4 | 1.1 |
| 8 | Volume of 15% HCl used to clean sand pack (cc) | 200 | 200 | 200 |
| 9 | % of initial water perm after acidizing | 3.0 | 3.9 | 1.6 |

Each of the three sand packs was composed of 88:10:2 parts by weight 70–170 mesh sand, silica flour and smectite, respectively. Results of this evaluation indicate that this branched, water-soluble polymer [a branched methacrylate copolymer (MW ~ 1,000,000)] was effective in reducing water permeability in 350° F. to 500° F. dynamic steam environments. Data also shows that deposited branched polymers were resistant to wash-off by acidic fluids. These fluids are often used to stimulate formation fluid production in hydrocarbon producing formations.

TABLE 5

Alteration Of Flow and Viscosifying Properties Based On Branched Polymer Characteristics

| Molecular Weight of MPEO** Branch | Viscosity, Cps. Of Polymeric Solution | | % $K_i$ Using 0.05% Polymer in 6% NaCl* |
|---|---|---|---|
| | 2% In Fresh Water | 1.5% In 5% HCl | |
| 5000 | 161 | 71 | 3.1 |
| 2000 | 121 | 59 | 6.0 |
| 750 | 81 | 24 | 38 |
| 350 | 78 | 28 | 44 |

*Alteration of flow properties in Berea core. $K_i$ = initial brine permeability of core.
**MPEO is methoxypolyethylene glycol or methoxypolyethlene oxide (Union Carbide Carbowax ®).

A commercially available PDMAEM (molecular weight 600,000–800,000) constituted the backbone. Viscosity of the aqueous solution of the backbone polymer is approximately 20 cps at 25° C. at 2% polymer solids. All grafted polymers were a 1:1 ratio by weight of MPEO to backbone polymer. Less branching resulted with 5000 molecular weight MPEO than with 350 molecular weight MPEO grafts. Branched or grafted polymers were prepared by Procedures C and E. Data in Table 5 shows that as the branch chain decreases, the number of branches increases and the % $K_i$ goes from 3.1 to 44. Thus, the $K_i$ is significantly affected by a few long branch chains and even by a greater number of short branch chains. The data also shows that fewer longer molecular weight branch chains for this particular polymer family are more effective for increasing viscosity of aqueous and aqueous acid fluids.

TABLE 6

Aqueous Fluid Diverting and Water Permeability Reduction Properties of Methoxypolyethylene Oxide Branched PDMAEM - Simultaneous Injection Technique[1]

| Test Sand No. | Water Permeability, Darcy Before Treatment | Water Permeability, Darcy After Treatment | Reduction of Water Permeability By Treatment, % | Test Composition Parts By Weight | Relative Effluent Volume Passing Through Each Sand, cc |
|---|---|---|---|---|---|
| 1 | 0.762 | 0.016 | 97.9 | 88:10:2 Oklahoma #1 Sand, fine silica flour and bentonite | 173.9 |
| 2 | 0.481 | 0.028 | 94.2 | 88.9:11.1 Oklahoma #1 Sand and fine silica flour | 188.6 |
| 3 | 0.053 | 0.007 | 86.8 | Berea core Horizontal Permeability | 47.7 |
| 4 | 0.011 | 0.004 | 64.6 | Berea core Vertical Permeability | 35.2 |

[1]By the use of a common manifold set-up fluid injection was made simultaneously into all test sands of varying permeabilities. Injection pressure on all test sands were the same. The treating fluids were therefore permitted to enter each test sample inversely proportional to the resistances encountered in each sample. The polymeric solution treatment produced a more uniform injection profile of fluids into test samples with permeability variation. Note that the permeability of Test Sand 1 is 40 times that of Test Sand 4. During polymeric treatment only four times as much fluid passed through Test Sand 1 as compared to Test Sand 4. The data show a significant reduction in permeability to aqueous fluid flow for all four samples which indicates the branched polymer is effective for aqueous fluid loss control.

TABLE 7

Branched Polymer Properties - Their Effect On Reducing Water Permeabilities
Backbone Polymer - PDMAEM
Molecular Weight about 1,000,000 Reacted With
Branch Polymer - Methoxypolyethylene Oxide (MPEO)
Molecular Weight: 5000

| Backbone Polymer: Branch Polymer Ratio By Weight | Concentration of Polymer In Treating Solution, % | Reduction Of Brine Permeability, % |
|---|---|---|
| 0:1 | .05 | 0–5 |
| 1:10 | .05 | 55 |
| 1:5 | .05 | 76 |
| 1:2.5 | .05 | 94 |
| 1:1 | .05 | 96.9 |
| 1:0.5 | .05 | 92 |
| 1:0.25 | .05 | 99.4 |
| 1:0.25 | .01 | 92 |
| 1:0.12 | .05 | 89 |
| 1:0.03 | .05 | 99 |
| 1:0.015 | .05 | 71 |
| 1:0.008 | .05 | 11 |
| 1:0.004 | .05 | 13 |
| 1:1 Unreacted* | .05 | 5 |
| 1:0 | .05 | 0.0 |

*For this test the backbone polymer (PDMAEM) was merely mixed with (not reacted with) the MPEO polymer.
All tests were run at 66° C. using Berea cores. An 8% NaCl solution was used to place the polymeric solution.

Data in Table 7 shows that some branching is necessary and that for certain polymers a small amount or degree of branching produces a significant effect. As you increase the number of branches the effectiveness increases up to a certain optimum point. This shows that each polymer family has a critical range for the ratio of backbone polymer to the number of branched chains. The first, next to the last and last data lines of the three columns are for an unbranched polymer or polymer mixture and they show that the unbranched polymer does not produce the unexpected effect on aqueous fluid permeability that the branched polymer family does.

TABLE 8

Alteration of Flow Properties in Bedford Limestone By Branched Polymers

| Polymer | Concentration In Treating Solution, % | Test Temp. °C. | Reduction In Water Permeability, % |
|---|---|---|---|
| Polyethylenimine PEI-1000 (Dow Chemical Co.) | 0.5 | 60 | 74* |
| PDMAEM (1,000,000 MW) with grafted polyethylene oxide (15,000 MW) branches 1:1 backbone-branch ratio by weight** | .01 | 66 | 94 |

*PEI-1000 was apparently washing off the limestone core, i.e., this is not an equilibrium or stabilized value.
**Graft polymer can also contain some crosslinking.

Data show that at least two different cationic polymers with high molecular weight branches and high molecular weight branched polymers are effective in reducing permeability to aqueous fluid.

TABLE 9

The Effect of Some Branched Polymers In Calcium Carbonate (70–200 m) Packs

| Treatment Polymer | Concentration (ppm) In Brine | Reduction in Water Perm. (%) |
|---|---|---|
| A | 1000 | 42 |
| B | 1000 | 23 |
| C | 1000 | 25 |
| A and C combined | 500 ppm each | 74 |
| A followed by C | 1000 ppm each | 72 |

Where A is an equal mole ratio copolymer of maleic anhydride and methylvinyl ether (~500,000 g/m) grafted with an equal weight of methoxypolyethylene glycol (~5000 g/m); B is an equal mole ratio copolymer of maleic anhydride and methylvinyl ether (~5000 g/m) grafted with an equal weight of polyethylene oxide (~5000 g/m); C is a polymer of dimethylaminoethylmethacrylate (~800,000 g/m) grafted with an equal weight of methoxypolyethylene glycol-epichlorohydrin adduct (~5000 g/m).

TABLE 10

Alteration Of Flow Properties By Branched And Unbranched Polymers

| No. | Polymer | Pore Vol. Of Brine Injected Thru Test Sand | Reduction In Water Permeability, % |
|---|---|---|---|
| 1. | $\left[-\underset{\underset{CH_3}{\mid}}{\overset{\overset{CH_3}{\mid}}{N^+}}-CH_2-\underset{\underset{OH}{\mid}}{CH}-CH_2-\right]_n \quad Cl^-$ <br> $n \cong 300$ <br> poly(dimethyl-2-hydroxypropyl ammonium chloride). | 10 | 0.0 |
| 2. | $\left[-\underset{\underset{CH_3}{\mid}}{\overset{\overset{CH_3}{\mid}}{N^+}}-CH_2-\underset{\underset{OH}{\mid}}{CH}-CH_2-\right]_x \left[-\underset{\underset{CH_3}{\mid}}{\overset{\overset{CH_3}{\mid}}{N^+}}-CH_2-\underset{\underset{O}{\mid}}{CH}-CH_2-\right]_y \quad Cl^-$ <br> $\left[\underset{\underset{\mid}{HC-CONH_2}}{\overset{CH_2}{\mid}}\right]_z$ <br> $x \cong 300$ <br> $y \cong 30$ <br> $z \cong 1000$ <br> Graft copolymer of the first polymer having polyacrylamide branches. | 100 | 43 |
| 3. | $\left[-\underset{\underset{CH_3}{\mid}}{\overset{\overset{CH_3}{\mid}}{N^+}}-CH_2-CH=CH-CH_2-\right]_n \quad Cl^-$ <br> $n \cong 100$ <br> poly(dimethyl-2-butenyl ammonium chloride). | 10 | 0.0 |
| 4. | poly(dimethyl diallyl ammonium chloride), cyclic structure with $N^+(CH_3)_2$ $Cl^-$ <br> $n \cong 200$ | 10 | 0.0 |
| 5. | $\left[-CH_2-\underset{\underset{C=O}{\mid}}{\overset{\overset{CH_3}{\mid}}{C}}-\right]_n$ with pendant $-O-CH_2-CH_2-\overset{+}{N}(CH_3)_2H \cdot A^-$ <br> $n \cong 3000$ <br> poly(dimethylaminoethyl methacrylate) salt with an anion such as $A^-$ | 10 | 0.0 |
| 6. | $+CH_2-CH_2-O+_n$ <br> $n \cong 100$ <br> poly(ethylene oxide) | 10 | 0–5 |

TABLE 10-continued

Alteration Of Flow Properties By Branched And Unbranched Polymers

| No. | Polymer | Pore Vol. Of Brine Injected Thru Test Sand | Reduction In Water Permeability, % |
|---|---|---|---|
| 7. | (structure shown below) | 10,000 | 85 |

$$\left[\begin{array}{c} CH_3 \\ | \\ -CH_2-C- \\ | \\ C=O \\ | \\ O \\ | \\ CH_2 \\ | \\ CH_2 \\ | \\ H_3C-N^+-CH_3 \\ | \\ H \\ A^- \end{array}\right]_x \left[\begin{array}{c} CH_3 \\ | \\ -CH_2-C- \\ | \\ C=O \\ | \\ O \\ | \\ CH_2 \\ | \\ CH \quad Cl^- \\ | \\ H_3C-N^+-CH_3 \\ | \\ CH_2 \\ | \\ HO-CH \\ | \\ CH_2 \\ \left[\begin{array}{c} O \\ | \\ CH_2 \\ | \\ CH_2 \end{array}\right]_z \\ O \\ | \\ CH_3 \end{array}\right]_y$$

$x \cong 3000$
$y \cong 30$
$z \cong 100$
A graft copolymer of polymer No. 5 grafted with methoxy-polyethylene glycol epichlorohydrin adduct.

| 8. | (structure shown below) | 40 | 5 |
|---|---|---|---|

$$-\!\!+\!\!CH_2-CH\!\!+_x\!\!+\!\!CH_2-CH\!\!+_y\!\!-$$
$$\quad\quad\quad\;|\quad\quad\quad\quad\;|$$
$$\quad\quad\;C\!=\!O\quad\quad C\!=\!O$$
$$\quad\quad\;|\quad\quad\quad\quad\;|$$
$$\quad\quad\;NH_2\quad\quad O^-$$
$$\quad\quad\quad\quad\quad\quad\quad\; Na^+$$

$x \cong 50,000$
$y \cong 15,000$
Partially hydrolyzed polyacrylamide or co(polyacrylamide sodium acrylate).

Data in Table shows that the branched polymers are effective for reducing permeability to aqueous fluid flow where the linear polymers are not.

TABLE 11

Water Wetting Characteristics Of Aqueous Solutions Of Various Polymers And Surfactants*

| Chemical | Contact Angle (degree) |
|---|---|
| Blank of Deionized Water | 36 |
| Polyethylenimine Polymer PEI-1000 (Dow Chemical Co.) | 31.8 |
| PDMAEM Branched with MPEO adduct | 22.2 |
| Diallyldimethylammonium chloride Polymer (Calgon TRO-522) | 35.6 |
| Nalco-607 - A branched and crosslinked polyamine polymer (20,000–25,000 molecular weight) | 39.0 |
| Nalco-108 - A condensation polymer of dimethylamine and epichlorohydrin (5000 molecular weight) | 44.5 |
| Anionic aromatic petroleum sulfate (water wetting) | 16.5 |
| Cationic surfactant blend of quaternary amines (oil wetting) | 134.0 |

*All test solutions were at pH 4 with 1% polymer solids or 1% active concentration.

Data in this table demonstrates that the branched cationic polymers are water wetting and have some surface active characteristics. The contact angles were measured using a clean glass slide immersed in diesel oil with the polymer or surfactant dissolved in deionized water.

For aqueous fluid treatment with certain branched polymers, the surface tension is decreased, which also normally results in a lower interfacial tension between aqueous and organic or hydrocarbon fluids.

TABLE 12

The Influence Of A Branched Polymer On The Relative Oil Permeability[a]

| Test Step | Test #1 (untreated) | Test #2 Polymer (treated) |
|---|---|---|
| Initial water permeability (md) | 911 | 906 |
| Polymer treatment (PV)[b] | 0 | 2 |
| Water permeability after treatment (md) | 911 | 38 |
| Oil permeability (md)[c] | 8 | 164 |

[a]Produced crude oil, produced water and core material used were from the Ranger formation, Wilmington field, California.
[b]A concentration of 1000 parts per million was used.
[c]These oil permeabilities were taken at irreducible water saturation.

The core samples were stabilized to flow with produced water, then treated with the pore volume (PV) of polymer and the permeability was measured with produced water and crude oil.

The data shows that the branched polymer treatment decreased permeability to aqueous fluid and increased permeability to oil flow.

TABLE 13

Alteration Of Flow Properties Of Various Polymers - Effectiveness vs Extended Flow

| Polymer | Test Solids | Initial Permeability Of Test Solids, Md. | Polymer In Treating Solution, % | Pore Volumes of Brine Injected Through Treated Solids | Reduction In Permeability,[c] % |
|---|---|---|---|---|---|
| Polyethylenimine (Dow PEI-12) Molecular Weight: 1200 | 1[a] | 100 | 0.5 | 8<br>45<br>80<br>120 | 60<br>33<br>7<br>0 |
| Polyethylenimine (Dow PEI-1000) Molecular Weight: 50,000–100,000 | Bedford Limestone | 42.5 | 0.5 | 1000<br>2000<br>3000<br>4000 | 65<br>65<br>60<br>58 |
| Polyacrylamide (Calgon WC-500) 20% Anionic | 2[a] | 450 | .05 | 120<br>270<br>380<br>570 | 51<br>38<br>29<br>22 |
| Polyacrylamide (Dow J-217) Molecular Weight: 1,800,000 13% anionic 5.8 Intrinsic viscosity | Berea Sandstone | 88 | 0.3 | 30<br>60<br>200<br>270<br>270 | 66<br>56<br>15<br>11<br>11 |
| PDMAEM Molecular Weight: 600,000–800,000 Branched with MPEO adduct (5000 molecular weight) Backbone and branch polymers reacted in a 1:1.75 weight ratio | Berea Sandstone | 95.5 | 0.01 | 190<br>1270<br>2108<br>3427<br>5949<br>11580<br>13499 | 88<br>88<br>87<br>86<br>85<br>83<br>88 |
| PDMAEM Molecular Weight: 600,000–800,000 Branched with polyethylene glycol (Union Carbide Carbowax 20M- Molecular Weight: 15,000). Backbone and branch polymers reacted in a 1:1 weight ratio[b] | Bedford Limestone | 13.8 | 0.1 | 200<br>400<br>600<br>800<br>1000 | 75<br>75<br>75<br>75<br>75 |

[a]Test solids #1 consisted of 88:10:2 parts by weight respectively of Oklahoma No. 1 sand, fine silica flour and bentonite. Test solids #2 consisted of 85:15 parts by weight respectively of Oklahoma No. 1 sand and fine silica flour.
[b]Some crosslinking may exist in the final polymer along with branching. Some hydrophilic crosslinking in specific application areas can be advantageous.
[c]Brine permeability.

The data show that resistance to wash-off or stability varies with the polymer structure and that the high molecular weight, branched polymers are highly stable or do not wash off after flushing with over 10,000 pore volumes of aqueous fluid.

TABLE 14

Relative Quantities Of Backbone And Branch Polymer

| Cationic Polymeric:Adduct Weight Ratio | Cationic Polymer Solution (10% Polymer Solids) (gm) | Water (ml) | MPEO Adduct (50% Polymer Solids) (gm) |
|---|---|---|---|
| 1.50:0 | 30 | 45 | 0 |
| 1.25:0.25 | 25 | 49 | 1 |
| 1.00:0.50 | 20 | 53 | 2 |
| 0.75:0.75 | 15 | 57 | 3 |
| 0.50:1.00 | 10 | 61 | 4 |
| 0.25:1.25 | 5 | 65 | 5 |
| 0:1.50 | 0 | 69 | 6 |

TABLE 15

Viscosity Properties Of PDMAEM Grafted With MPEO Adduct

| PDMAEM:MPEO 350** Weight Ratio | Apparent Viscosity, cp at 25° C. | |
|---|---|---|
| | Water (2% Active Polymer) | 5% HCl (1.5% Active Polymer) |
| 1.5:0 | 27 | 8 |
| 1.25:0.25 | 82 | 25 |
| 1.00:0.5 | 73* | 32 |
| 0.75:0.75 | 78* | 28 |
| 0.5:1.0 | 25 | 7 |
| 0.25:1.25 | 14 | 3 |
| 0:1.5 | 3 | 1 |

*Foamy
**A commercially available PDMAEM with a molecular weight of about 600,000–800,000. MPEO 350 is Union Carbide's methoxypolyethylene glycol or oxide with a molecular weight of about 350 sold under the trademark "CARBOWAX ®."

The data shows that branching is necessary for a stable polymer to gel aqueous and aqueous acid fluids. The data also shows that the number of branches affect the efficiency or effectiveness of the branched polymer for gelling aqueous fluids.

TABLE 16

Viscosity Of PDMAEM Grafted With MPEO Adduct

| PDMAEM:MPEO 750** Weight Ratio | Apparent Viscosity, cp at 25° C. | |
|---|---|---|
| | Water (2% Active) | 5% HCl (1.5% Active) |
| 1.5:0 | 17 | 7 |
| 1.25:0.25 | 39 | 28 |
| 1.0:0.5 | 52* | 26 |
| 0.75:0.75 | 81 | 24 |
| 0.5:1.0 | 7 | 5 |
| 0.25:1.25 | 3 | 1 |

TABLE 16-continued

Viscosity Of PDMAEM Grafted With MPEO Adduct

| PDMAEM:MPEO 750** Weight Ratio | Apparent Viscosity, cp at 25° C. | |
|---|---|---|
| | Water (2% Active) | 5% HCl (1.5% Active) |
| 0:1.50 | 1 | 1 |

*Foamy.
**MPEO 750 is a Union Carbide CARBOWAX polymer having a molecular weight of about 750.

The data shows the same effects as in Table 15 plus the effect of higher molecular weight or longer branch chains.

TABLE 17

Viscosity of PDMAEM Grafted With MPDO Adduct

| PDMAEM:MPEO 2000** Weight Ratio | Apparent Viscosity (cps) | | |
|---|---|---|---|
| | Water (2% Active) | 5% HCl (1.5% Active) | |
| | | Initial | 24 hrs @ 60° C. |
| 1.5:0 | 13 | 7 | 11 |
| 1.43:0.07 | 37 | 20 | 4 |
| 1.36:0.14 | 105 | 45 | 50 |
| 1.25:0.25 | 200 | 114 | 142 |
| 1.00:0.50 | 198* | 127 | 152 |
| 0.75:0.75 | 121 | 59 | 80 |
| 0.50:1.00 | 75 | 20 | 44 |
| 0.25:1.25 | 7 | 3 | 8 |
| 0:1.50 | 3 | 1 | 1 |

*Foamy.
**MPEO - molecular weight about 2000.

The data shows the same effects as Tables 15 and 16 for higher molecular weight branch chains. The data also shows that the branched polymer is stable in acid at high temperatures for extended periods of time.

TABLE 18

Viscosity of PDMAEM Grafted With MPEO Adduct

| PDMAEM:PDEO 5000* Weight Ratio | Apparent Viscosity (cps) | | |
|---|---|---|---|
| | Water (2% Active) | 5% HCl (1.5% Active) | |
| | | Initial | 24 hrs @ 60° C. |
| 1.5:0 | 15 | 6 | 8 |
| 1.43:0.07 | 26 | 14 | 15 |
| 1.36:0.14 | 60 | 39 | 15 |
| 1.25:0.25 | 120 | 49 | 52 |
| 1.0:0.5 | 141 | 68 | 56 |
| 0.75:0.75 | 161 | 71 | 77 |
| 0.60:0.90 | 124 | 46 | — |
| 0.5:1.0 | 98 | 23 | 27 |
| 0.25:1.25 | 32 | 7 | 9 |
| 0.14:1.36 | 7 | 3 | 21 |
| 0:1.5 | 3 | 1 | 1 |
| 0.75:0.75** | 8 | 4 | — |

*MPEO 5000 is a CARBOWAX ® polymer having a molecular weight of about 5000.
**For the mixture of PDMAEM, no epichlorohydrin was reacted with the polyethylene oxide polymer to prepare an adduct but the pH was adjusted to about 9.5 and the polymer solution heated for two hours at 60° C. as in Procedure E.

The data shows the same effects as Table 17.

TABLE 19

Viscosity Properties of Modified-Branched Polymers (Polyethylenimine)

| Branched Polymer | Modifying Agent | Apparent Viscosity, cp at 25° C. (4% Active) |
|---|---|---|
| Chemicat P-145[a] | Nalco PS 2007M[c] | 114 |
| EPOMIN P-1000[b] | Nalco PS 2007M | 79 |
| Chemicat P-145 | Nalco R69M[d] | 46 |
| Chemicat P-145 | None | 5 |
| EPOMIN P-1000 | None | 3 |

These branched Polymers are modified as in Procedure F.
[a]Polyethyleneimine from Alcolac Incorp.
[b]Polyethyleneimine from Japan Catalytic.
[c]Ethylene-propylene oxide copolymer reacted with epichlorohydrin.
[d]Polyethylene glycol 250 reacted with epichlorohydrin.

TABLE 20

Effect of Branched Cationic Polymers on Reaction Time of 5% HCl with Limestone[a]

| Acid Solution | Contact Time (min) With Limestone | % HCl Remaining |
|---|---|---|
| 5% HCl | 0 | 5 |
| | 5 | 2.6 |
| | 10 | 2.3 |
| 5% HCl Gelled With Modified PEI[b] | 0 | 5 |
| | 5 | 3.4 |
| | 10 | 3.25 |
| | 30 | 3.0 |
| | 45 | 2.8 |

[a]Bedford Limestone
[b]EPOMIN P-1000 modified with ethylene-propylene oxide copolymer epichlorohydrin adduct (4% active solution) as described in Procedure F.

TABLE 21

Viscosity And Stability Of Various Polymers In Water And Acid

| Polymer | Apparent Viscosity (cps) | | |
|---|---|---|---|
| | Water (2% Active) | 5% HCl (1.5% Active) | |
| | | Initial | 2 hrs @ 60° C. |
| Polyvinyl alcohol VINOL 1540 (Air Products & Chemicals, Inc.) | 42 | 35 | 6 |
| poly(2-acrylamido-2-methyl propyl sulfonate) AMPS (Lubrizol Company) | 55* | 35 | 28 |
| Polyvinylpyrrolidone PVP (GAF Corporation) | 35 | 5 | 6 |
| Copolymer of acrylate (30%) and acrylamide (70%) | 135 | 22 | ** |
| Copolymer of AMPS (20%) and acrylamide (80%) | 115 | 37 | 12 |
| Copolymer of acrylamide (70%) and N,N,N—trimethylaminoethyl methacrylate | 120 | 62 | 9** |
| Copolymer of acrylamide (70%) and N,N—dimethylaminoethyl methacrylate | 78 | 10 | ** |

*Foamy.
**Polymer precipitated.

The data shows the effectiveness and stability of various linear polymers in aqueous and aqueous acid fluids for extended times at high temperature.

TABLE 22

Radial Penetration Into A Formation vs. Porosity

| Porosity (%) | Radial Treatment Distance (ft) | Treatment Volume Per Interval Ft. (bbl/ft) |
|---|---|---|
| 10 | 10 | 5.6 |
| 10 | 20 | 22 |
| 10 | 30 | 50 |
| 10 | 40 | 90 |
| 10 | 50 | 140 |
| 20 | 10 | 11.8 |
| 20 | 20 | 44.7 |
| 20 | 25 | 70 |

TABLE 22-continued

Radial Penetration Into A Formation vs. Porosity

| Porosity (%) | Radial Treatment Distance (ft) | Treatment Volume Per Interval Ft. (bbl/ft) |
|---|---|---|
| 20 | 30 | 101 |
| 20 | 40 | 179 |
| 20 | 50 | 280 |
| 30 | 10 | 16.8 |
| 30 | 20 | 67 |
| 30 | 30 | 151 |
| 30 | 40 | 269 |
| 30 | 50 | 420 |

TABLE 23

Development Well Treatment

This developmental production well is located on a waterflood project and had been shut in due to excessive water production. It was put back on production in order to establish initial production data. Fluid entry surveys were performed prior to and after WOR polymer treatment. This well was gravel packed and has 839 net feet producing. The treatment with 30 drums of concentrated polymer solution of a cationic polymer with nonionic branches diluted 1:40 with injection water gave about 1200 PSI increase in injection pressure. This solution was overdisplaced with 350 barrels of injection water.

| Time (days) | Gross (BPD) | Water (BPD) | Oil (BPD) | Calculated Water (BPD) | FOP* (ft) | Drawdown (PSI) | Productivity Index (BPD/PSI) |
|---|---|---|---|---|---|---|---|
| Initial | 4310 | — | 55 | | 1500 | | |
| 0 | 5200 | 5145 | 55 | 5145 | 1725 | 46 | 113 |
| 1 | 4183 | 4094 | 89 | — | — | — | — |
| 2 | 3995 | 3929 | 66 | 495 | 954 | 365 | 11.0 |
| 6 | 5004 | 4937 | 67 | 484 | 704 | 469 | 10.7 |
| 7 | 4867 | 4782 | 85 | 469 | 704 | 469 | 10.4 |
| 8 | 4823 | 4721 | 102 | — | — | — | — |
| 9 | 4821 | 4717 | 104 | 442 | 649 | 491 | 9.8 |
| 10 | 4817 | 4723 | 94 | 433 | 624 | 502 | 9.6 |
| 11 | 4815 | 4711 | 104 | 441 | 649 | 491 | 9.8 |
| 12 | 4814 | 4695 | 119 | 424 | 604 | 510 | 9.4 |
| 13 | 4794 | 4677 | 117 | 422 | 604 | 510 | 9.3 |
| 15 | 4628 | 4520 | 108 | — | — | — | — |
| 16 | 4227 | 4118 | 109 | 356 | 549 | 533 | 7.9 |
| 17 | 4701 | 4587 | 114 | — | — | — | — |
| 18 | 4732 | 4596 | 136 | 389 | 524 | 543 | 8.7 |
| 19 | 4713 | 4567 | 146 | — | — | — | — |
| 20 | 4684 | 4542 | 142 | — | — | — | — |
| 21 | 4660 | 4519 | 141 | — | — | — | — |
| 22 | 4663 | 4520 | 143 | — | — | — | — |
| 23 | 4616 | 4481 | 135 | — | — | — | — |
| 24 | 4624 | 4474 | 150 | 362 | 464 | 568 | 8.1 |
| 25 | 4625 | 4479 | 146 | — | — | — | — |
| 26 | 4593 | 4439 | 154 | — | — | — | — |
| 27 | 4578 | 4437 | 141 | — | 764* | — | — |
| 28 | 4704 | 4534 | 170 | — | — | — | — |
| 29 | 4676 | 4491 | 185 | — | — | — | — |
| 30 | Downhole breakdown | | | | | | |
| | Pump on | | | | | | |
| 31 | 5065 | 5026 | 39 | — | 1500 | 140 | 36.2 |
| 32 | 5419 | 5314 | 105 | — | — | — | — |
| 33 | 5092 | 4965 | 127 | — | — | — | — |
| 34 | 5193 | 5106 | 87 | — | — | — | — |
| 35 | 5160 | 4864 | 296 | — | — | — | — |
| 36 | 4493 | 4460 | 33 | — | — | — | — |
| 37 | 5112 | 4780 | 332 | — | 565 | 527 | 9.7 |
| 38 | 5032 | 4755 | 277 | — | — | — | — |
| 39 | 5131 | 4735 | 396 | — | 565 | — | — |
| 40 | 4355 | 4099 | 346 | — | 565 | — | — |
| 41 | 5063 | 4700 | 363 | — | — | — | — |
| 42 | 5027 | 4686 | 341 | — | 515 | 547 | 8.6 |
| 43 | 4970 | 4673 | 297 | — | — | — | — |
| 45 | 4979 | 4677 | 302 | — | — | — | — |
| 46 | 4985 | 4641 | 344 | — | — | — | — |
| 48 | 4964 | 4579 | 385 | — | 405 | — | — |
| 49 | 4811 | 4606 | 205 | — | — | — | — |
| 50 | 4487 | 4417 | 70 | — | — | — | — |
| | Fluid Entry | | | | | | |
| 51 | 4850 | 4608 | 242 | — | 515 | — | — |
| 52 | 4807 | — | 193 | — | — | — | — |
| 53 | 4892 | — | 363 | — | — | — | — |
| 54 | 4783 | 4537 | 246 | — | 405 | — | — |
| 55 | 4790 | 4530 | 260 | — | 430 | — | — |
| 56 | 4782 | 4536 | 246 | — | 405 | — | — |

TABLE 23-continued

Development Well Treatment

This developmental production well is located on a waterflood project and had been shut in due to excessive water production. It was put back on production in order to establish initial production data. Fluid entry surveys were performed prior to and after WOR polymer treatment. This well was gravel packed and has 839 net feet producing. The treatment with 30 drums of concentrated polymer solution of a cationic polymer with nonionic branches diluted 1:40 with injection water gave about 1200 PSI increase in injection pressure. This solution was overdisplaced with 350 barrels of injection water.

| | Production Rate | | | Calculated | Pressure | | Productivity |
|---|---|---|---|---|---|---|---|
| Time (days) | Gross (BPD) | Water (BPD) | Oil (BPD) | Water (BPD) | FOP* (ft) | Drawdown (PSI) | Index (BPD/PSI) |
| 57 | 4737 | 4460 | 277 | — | — | — | — |
| 58 | 4730 | 4508 | 222 | — | 310 | — | — |
| 59 | 4738 | 4588 | 250 | — | — | — | — |
| 60 | 4707 | 4481 | 266 | — | 515 | — | — |
| 65 | 4958 | 4411 | 547 | — | — | — | — |
| 66 | 4732 | 4411 | 321 | — | — | — | — |
| 67 | 4717 | 4378 | 339 | — | — | — | — |
| 68 | — | — | — | — | 310 | — | — |
| 90 | 4800 | — | 355 | — | 400 | — | — |

*FOP is feet of liquid over pump.

TABLE 24

Developmental Well Treatment

This development treatment well is located on a waterflood project. It has been gravel packed and has 571 net feet producing fluid. Several test and fluid entry surveys have been run both before and after the WOR polymer treatment. The initial oil production rate varied. The WOR polymer treatment consisted of 24 drums of concentrated polymer solution of a cationic polymer with nonionic branches diluted 1:48 with injection water with a 1200 barrel overdisplacement of injection water.

| | Production Rate | | | | | Pressure | |
|---|---|---|---|---|---|---|---|
| Time (days) | Gross (BPD) | Water (BPD) | Oil (BPD) | Water:Oil Ratio | Gas (mdf) | FOP (ft) | Comments |
| Initial | 2057 | — | 40–73 | 50–27 | — | 480 | |
| 0 | 2075 | 2006 | 69 | 29 | 16 | 482 | |
| 1 | 2176 | 2084 | 92 | — | — | — | |
| 2 | 1689 | 1599 | 90 | — | — | — | |
| 3 | 1466 | 1393 | 73 | — | 21 | 147 | |
| 4 | 1325 | 1266 | 59 | — | — | — | put on 24/64 choke total pressure = 300 PSI. |
| 5 | 1252 | 1190 | 62 | — | — | — | |
| 6 | — | — | — | — | — | 146 | Took choke out. |
| 7 | 1174 | 1119 | 55 | — | — | — | |
| 8 | 1147 | 1106 | 41 | — | — | — | |
| 9 | — | — | — | — | — | 447 | |
| 10 | — | — | — | — | — | — | Pump went down. |
| 11 | 1718 | 1669 | 49 | — | — | — | |
| 12 | 1481 | 1404 | 77 | — | — | — | |
| 13 | 1326 | 1266 | 60 | — | — | 359 | Pump cycling |
| 15 | — | — | — | — | — | 294 | |
| 16 | 1214 | 1157 | 57 | — | — | — | |
| 17 | 1186 | 1146 | 40 | — | — | — | |
| 18 | 1165 | 1108 | 57 | — | — | 294 | |
| 19 | 1144 | 1100 | 44 | — | — | — | |
| 20 | 1129 | 1066 | 53 | — | — | — | |
| 21 | 1106 | 1052 | 54 | — | — | — | |
| 22 | 1094 | 1041 | 53 | — | — | — | |
| 25 | 1057 | 1011 | 46 | — | — | 214 | |
| 26 | 1054 | 1008 | 46 | — | — | — | |
| 27 | 1045 | 993 | 52 | — | — | — | |
| 28 | 1031 | — | 34 | — | — | 274 | |
| 30 | 1016 | — | 52 | — | — | — | |
| 31 | — | — | — | — | — | 274 | |
| 32 | 1015 | 980 | 35 | — | — | — | |
| 33 | 1013 | 962 | 31 | — | — | — | |
| 34 | 1014 | 973 | 41 | — | — | — | |
| 34 | Ran tool in for fluid entry survey but found well not stabilized. | | | | | | |
| 35 | 830 | 824 | 6 | — | — | 674 | |
| 36 | 732 | 704 | 28 | — | — | 674 | |
| 36 | 1180 | 1107 | 73 | — | — | — | |
| 37 | 1125 | 1076 | 49 | — | — | — | |
| 38 | 1117 | 1070 | 47 | — | — | — | |
| 39 | 1119 | 1064 | 55 | — | — | 274 | |

TABLE 24-continued

Developmental Well Treatment

This development treatment well is located on a waterflood project. It has been gravel packed and has 571 net feet producing fluid. Several test and fluid entry surveys have been run both before and after the WOR polymer treatment. The initial oil production rate varied. The WOR polymer treatment consisted of 24 drums of concentrated polymer solution of a cationic polymer with nonionic branches diluted 1:48 with injection water with a 1200 barrel overdisplacement of injection water.

| Time (days) | Production Rate Gross (BPD) | Water (BPD) | Oil (BPD) | Water:Oil Ratio | Gas (mdf) | Pressure FOP (ft) | Comments |
|---|---|---|---|---|---|---|---|
| 40 | Ran tool in for fluid entry survey. | | | | | | |
| 40 am | 900 | 880 | 20 | — | — | — | |
| 40 pm | 900 | 860 | 40 | — | — | — | |
| 40 | Ran fluid entry survey. | | | | | | |
| 42 | 1167 | 1119 | 48 | — | — | — | |
| 43 | 1148 | 1110 | 38 | — | — | — | |
| 44 | 1138 | 1083 | 55 | 21 | — | — | |
| 45 | — | — | — | — | — | 214 | |
| 60 | 1020 | — | 52 | 19 | — | 280 | |

TABLE 25

Developmental Well Treatment

This well was an old flowing well with a bottom hole static temperature (BHST) of about 104° C. with five feet of perforations at 11,446 feet. Four drums of heated concentrated polymer solution of a cationic polymer with nonionic branches was used at a dilution of 1:30. This was overdisplaced with 300 barrels of gun barrel water.

| Time (days) | Production Ratio Gross (PPD) | Water (BPD) | Oil (BPD) | Water:Oil Ratio | Pressure (PSI) | Comments |
|---|---|---|---|---|---|---|
| Initial | 1425 | — | 28 | 50 | 525 | 24/64 choke |
| 0 | 1425 | 1397 | 28 | 50 | 525 | 24/64 choke |
| 1 | 1242 | 1217 | 25 | 29 | — | |
| 2 | 1260 | 1234 | 26 | 47 | 560 | |
| 3 | 1284 | 1220 | 64 | 19 | 825 | |
| 3 | 1296 | 1231 | 65 | 19 | 800 | |
| 5 | 1240 | 1178 | 62 | 19 | 800 | |
| 6 | 1260 | 1197 | 63 | 19 | 800 | |
| 7 | 1254 | 1191 | 63 | 19 | 800 | |
| 12 | 1211 | 1150 | 61 | 19 | — | |
| 13 | 1658 | 1575 | 83 | 19 | 560 | 28/64 choke |
| 15 | 1451 | 1378 | 73 | 19 | 642 | 25/64 choke |
| 50 | 1400 | — | 73 | 18 | 642 | 25/64 choke |

TABLE 26

Development Well Treatment

This well had ten feet perforated at 10,000 feet and was on gas-lift. The treatment was performed using 12 drums of concentrated polymer solution of a cationic polymer with nonionic branches diluted 1:19 with preheated gun barrel water and overdisplaced with 300 barrels of gun barrel water.

| Time (days) | Production Rate Gross (BPD) | Water (BPD) | Oil (BPD) | Water:Oil Ratio | Choke |
|---|---|---|---|---|---|
| Initial | 642 | 629 | 13 | 49 | |
| 1 | 580 | 493 | 87 | — | |
| 2 | 1297 | 1297 | 0 | — | |
| 3 | 1376 | 1348 | 28 | — | |
| 4 | 1318 | 1292 | 26 | — | |
| 16 | 1119 | 1097 | 22 | — | |
| 18 | 1431 | 1403 | 28 | — | |
| 29 | 1431 | — | — | 31 | 48/64 |
| 15 | 1431 | — | 28 | 50 | |

TABLE 27

Developmental Well Treatment

| Time (days) | Oil (BPD) | Water (BPD) | Water:Oil Ratio | API Gravity | Fluid Level | Gross Fluid | Fluid Level Differential |
|---|---|---|---|---|---|---|---|
| Before Treatment | 36 | 1270 | 35 | 17.6 | 2548 | 1306 | 0 |
| 8 | 23 | 1508 | — | 20.3 | 2935 | 1531 | 387 |
| 9 | 37 | 1514 | — | 20.3 | 3062 | 1561 | 518 |
| 13 | 49 | 1288 | — | 20.3 | 3126 | 1337 | 578 |
| 15 | 43 | 1291 | — | 20.3 | 3126 | 1334 | 578 |
| 18 | 47 | 1447 | — | 20.3 | 3222 | 1494 | 674 |
| 21 | 61 | 1470 | 24 | 20.4 | 3286 | 1531 | 738 |

TABLE 28

Developmental Well Treatment

This well was treated with eight drums of concentrated polymer of a cationic polymer with nonionic branches dissolved in 150 barrels of NH4Cl water with one 25-barrel spacer and overdisplaced with 175 barrels of lease brine.

| Time (days) | Production Data Gross (BPD) | Water (BPD) | Oil (BPD) | Water:Oil Ratio | GL Press.* (PSI) | Tubing Pressure (PSI) |
|---|---|---|---|---|---|---|
| Prior to Treatment | 1180 | 1164 | 16 | 73 | — | — |
| 2 | 1066 | 1040 | 26 | 40 | 800 | 150–350 |
| | 1156 | 1128 | 28 | 40 | 780 | 120–430 |
| 4 | 1282 | 1266 | 16 | 79 | 780–800 | 120–430 |
| 7 | 1310 | 1296 | 14 | 93 | 785 | 125–430 |
| 22 | 1298 | 1279 | 26 | 50 | — | — |

Gross Injected      Gas Recovered

TABLE 28-continued

Developmental Well Treatment
This well was treated with eight drums of concentrated polymer of
a cationic polymer with nonionic branches dissolved in 150
barrels of NH4Cl water with one 25-barrel spacer and
overdisplaced with 175 barrels of lease brine.

|    | (MCF) | (MCF) |
|----|-------|-------|
| 33 | 240   | 203   |
| 34 | 209   | 267   |
| 35 | 209   | 249   |
| 37 | 209   | 244   |

*GL is gas lift pressure at the surface.

TABLE 29

The Effect Of Injection Rate Through A
Perforation Tunnel On A Branched Polymer Solution[a]

| Polymer Concentration (ppm) | Injection Rate (gal/min.) | Percent of initial Polymer Effectiveness[b] |
|---|---|---|
| 1000 (unsheared) | 0  | 100 |
| 1600             | 1  | 102 |
| 1600             | 3  | 109 |
| 1600             | 11 | 102 |
| 800 (unsheared)  | 0  | 100 |
| 800              | 1  | 103 |
| 800              | 3  | 110 |
| 800              | 11 | 113 |

[a]Treatment solution was pumped through a simulated perforation tunnel (⅜″ I.D. × 3″ pipe) at various rates and samples were taken. These samples were evaluated and the results reported are based on the unsheared polymer treating solution for reducing water permeability of a Berea sandstone.
[b]Percent of initial WOR effectiveness.

The data shows that the branched polymer is not significantly affected or sheared by rapid pumping through a perforation.

We claim:

1. A method of treating a subterranean particulate formation to alter the relative mobilities of oil and water in and through the formation comprising contacting the formation with a branched organic polymer dissolved or dispersed in an aqueous carrier fluid in an amount sufficient to provide a concentration of from about 0.005 to about 1 percent by volume of said carrier fluid and for a period of time sufficient for the polymer to absorb on or otherwise attached to the formation, the branched organic polymer having a molecular weight of from about 900 to about 50,000,000 and having the structural formula:

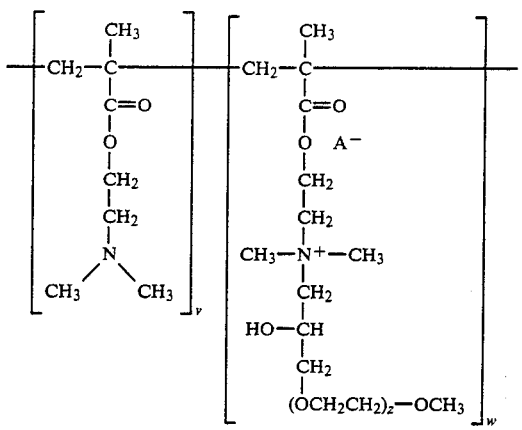

wherein:
v is in the range of from about 10 to about 15,000;
w is in the range of from about 1 to about 5,000;
z is in the range of from about 2 to about 10,000; and
$A^-$ is an anion or anionic group associated with the quaternary nitrogen.

2. The method of claim 1 wherein the carrier fluid is an aqueous saline solution.

3. The method of claim 1 wherein the carrier fluid is an aqueous acid solution of hydrochloric, hydrofluoric, nitric, sulfuric, phosphoric, acetic, formic, hydroxyacetic, sulfamic, citric, fumaric, oxalic, sodium dihydrogen phosphate and mixtures thereof.

4. The method of claim 1 wherein the molecular weight of said backbone chain is in the range of from about 1000 to 5,000,000.

* * * * *